United States Patent [19]
Kusase et al.

[11] Patent Number: 5,550,457
[45] Date of Patent: Aug. 27, 1996

[54] ELECTRIC POWER GENERATING DEVICE FOR VEHICLES

[75] Inventors: Shin Kusase; Kenzo Mitani, both of Obu; Atsushi Umeda, Anjo; Hirohide Sato, Toyokawa, all of Japan

[73] Assignee: Nippondenso Co., Ltd., Kariya, Japan

[21] Appl. No.: 380,821

[22] Filed: Jan. 30, 1995

[30] Foreign Application Priority Data

Jan. 31, 1994 [JP] Japan .................................. 6-009699
Aug. 9, 1994 [JP] Japan .................................. 6-187307
Aug. 9, 1994 [JP] Japan .................................. 6-187321

[51] Int. Cl.$^6$ ................................................ H02P 9/46
[52] U.S. Cl. ........................ 322/29; 322/47; 322/32; 322/28
[58] Field of Search ................................. 322/29, 32, 47

[56] References Cited

U.S. PATENT DOCUMENTS

| | | | |
|---|---|---|---|
| 3,675,117 | 7/1972 | Reimers | 322/31 |
| 3,829,758 | 8/1974 | Studtmann | 322/28 |
| 3,958,174 | 5/1976 | Studtmann et al. | 322/47 |
| 4,006,398 | 2/1977 | Gritter | 322/47 |
| 4,803,376 | 2/1989 | N'Guyen | 290/22 |
| 4,883,973 | 11/1989 | Lakey et al. . | |
| 5,029,288 | 7/1991 | Kubota et al. | 322/29 |
| 5,083,077 | 1/1992 | Wallace et al. | 322/32 |
| 5,177,677 | 1/1993 | Nakata et al. . | |
| 5,469,816 | 11/1995 | Murakawa et al. | 123/2 |

FOREIGN PATENT DOCUMENTS

| | | |
|---|---|---|
| 130242 | 1/1985 | European Pat. Off. . |
| 294146 | 12/1988 | European Pat. Off. . |
| 357183 | 3/1990 | European Pat. Off. . |
| 398222 | 11/1990 | European Pat. Off. . |
| 4007350 | 9/1990 | Germany . |
| 63-302119 | 12/1988 | Japan . |
| 2303400 | 12/1990 | Japan . |

OTHER PUBLICATIONS

Patent Abstract of Japan, vol. 17 No. 334 (E-1387), Jun. 1993, re JP-A 05 038150.
Patent Abstract of Japan, vol. 16 No. 447 (E-1266), Sep. 1992, re JP-A-04-156299.
N. Ammasaigouden et al., "Microprocessor-Based Voltage Controller for Wind-Driven Induction Generators", IEEE Transaction on Industrial Electronics, Dec. 1990 pp. 531-537.

*Primary Examiner*—Steven L. Stephan
*Assistant Examiner*—Nicholas Ponomarenko
*Attorney, Agent, or Firm*—Cushman, Darby & Cushman

[57] ABSTRACT

An electric power generating device including an induction type electric rotating machine rotating in interlock with an engine comprises an inverter connected at the AC side to and end of an armature winding and at the DC side to an electric power storing device, a detecting means for detecting the quantity of state related to the electric power generating voltage of the induction type electric rotating machine excluding the measured RPM of the induction type electric rotating machine but including the electric power storing voltage of the electric power storing device, and an electric power generation controlling means for maintaining the electric power storing voltage within the preset range by controlling the frequency of the controlling voltage of the inverter based on the quantity of state related to the electric power generating voltage. This electric power generating device can control the electric power generation without using any RPM detecting device for the induction electric machine, and as a result, the composition of the device can be simplified. The frequency can be controlled so that the frequency can be changed in the direction in which the difference between the electric power storing voltage and the preset reference voltage is reduced.

18 Claims, 15 Drawing Sheets

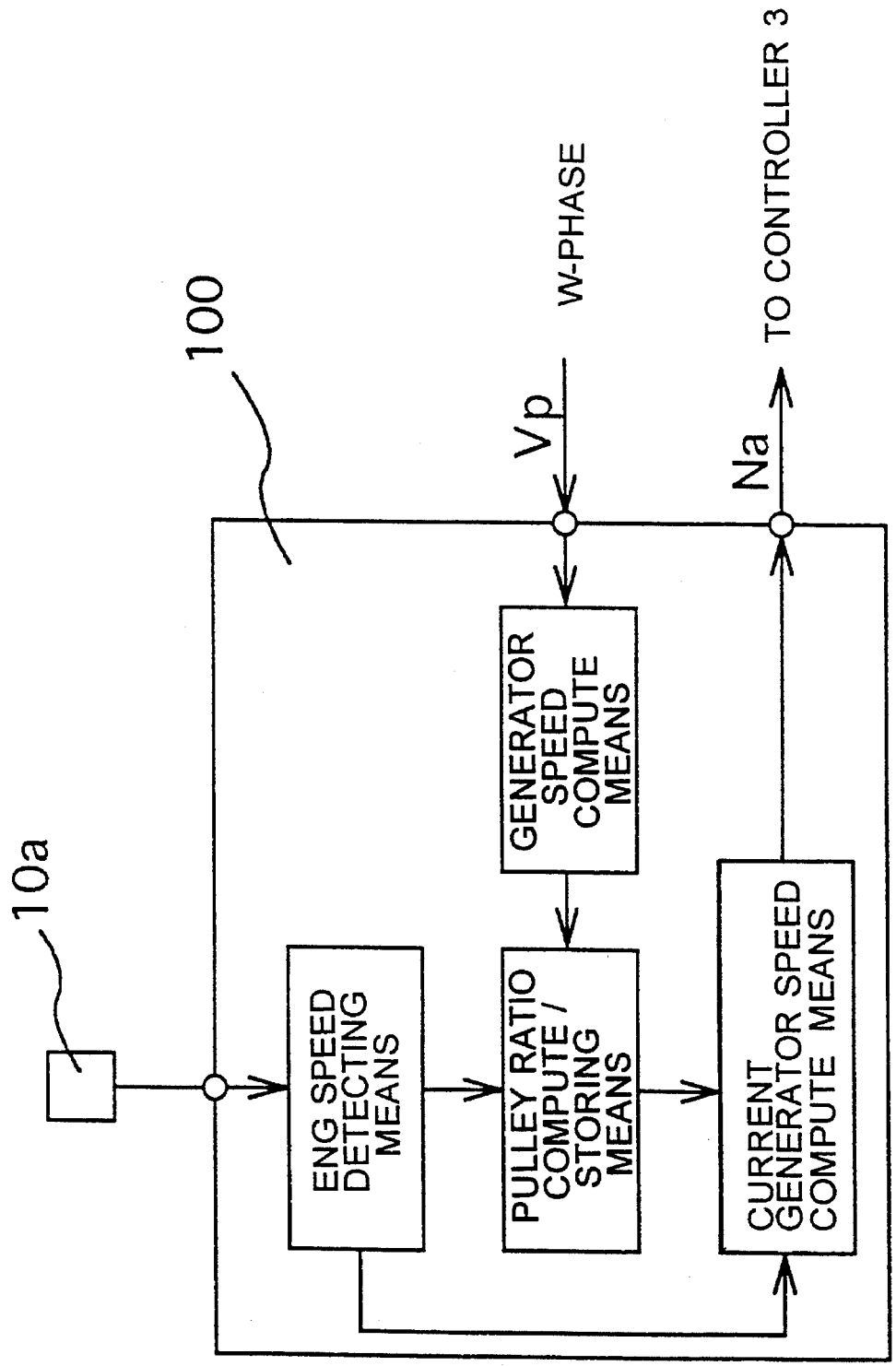

ELECTRIC POWER GENERATING DEVICE FOR VEHICLES

CROSS REFERENCE TO RELATED APPLICATION

This application is based upon and claims the benefit of priority of the prior Japanese Patent applications No. 6-9699 filed on Jan. 31, 1994, No. 6-187307 filed on Aug. 9, 1994 and No. 6-187321 filed on Aug. 9, 1994, the contents of which are incorporated herein by reference.

BACKGROUND OF THE INVENTION

1. Field of the Invention

The present invention generally relates to an electric power generating device for vehicles. More particularly, the present invention relates to an electric power generating device for charging a battery for vehicles by using an induction machine.

2. Related Arts

In the Japanese Unexamined Patent Publication (KOKAI) No. 63-302119, an induction type electric power generating device, which is driven by an exhaust gas turbine for vehicles, is disclosed. This induction type electric power generating device aims to give priority to the efficiency of the turbine and therefore operates within the rotation area of the best turbine efficiency by adjusting the slip thereof.

In the Japanese Unexamined Patent Publication (KOKAI) No. 2-87999, there is a proposal that the required slip state should be maintained by controlling the frequency of the inverter based on the revolution number (RPM) of the electric power generating device detected by an RPM sensor.

In the induction type electric power generating device proposed in the above publications, the electric power generating amount should be adjusted by detecting the RPM of the device and controlling the slip. However, in induction type electric power generating devices, unlike synchronous electric power generating devices, the exciting frequency is determined from the charging power source side. Characteristically, the torque, or the electric power generating amount significantly varies due to even slight change in the RPM (slip) in spite of the frequent, speedy speed variation of the slip caused by the variation of the engine RPM. Therefore, when an induction machine is applied to an electric power generating device for vehicles, there is a need to use a high-precision, high-responsive RPM sensor (speed sensor) to control the slip at a high speed and a high precision. This has been a major drawback of a conventional 3-phase synchronous electric power generating devices (alternators) in using induction type electric power generating devices as electric power generating devices for vehicles.

In particular, the above problem in controlling electric power generation by controlling the slip is more serious when the induction type electric power generating device is speed-increasingly driven by a belt for reducing the size and weight thereof or provided with multiple poles (8 poles or so) for increasing the frequency and speed.

SUMMARY OF THE INVENTION

In view of the above problem, the present invention has an object to provide an electric power generating device for vehicles which can stably and simply control the electric power generation performed by an induction type electric rotating machine working with a vehicle engine, the RPM of which varies frequently and speedily, without measuring the RPM of the induction type electric rotating machine.

To achieve the above object, in the present invention, particularly an electric power generation controlling means is provided for maintaining the electric power storing voltage of an electric power storing device within the reference range by controlling the frequency of a controlling voltage of an inverter, which is connected to an armature winding and the electric power storing device, based on the quantity of state related to the electric power generating voltage of the induction type electric rotating machine excluding the actually measured RPM of the induction type electric rotating machine but including the electric power storing voltage of the electric power storing device.

The quantity of state related to the electric power generating voltage except for the actually measured RPM of the induction type electric rotating machine referred to above is composed of signals obtained by collectively or individually processing the parameters including electric power generating voltage (voltage at the armature winding end of the induction type electric rotating machine), the terminal voltage of the electric power storing device (electric power storing voltage), the voltage difference between the electric power generating voltage and the electric power storing voltage, and the electric power generating current.

Furthermore, in the present invention, the electric power generation controlling means shifts the exciting frequency in the direction for reducing the difference between the electric power storing voltage of the electric power storing device and the preset reference voltage. That is, when the electric power storing voltage is lower than the reference voltage and charging should be reinforced, the frequency is reduced and the slip is shifted to the negative direction, whereby the electric power generating current is increased. On the other hand, when the electric power storing voltage is higher than the reference voltage and the electric power generating output can be reduced, the frequency is increased and the slip is shifted to the positive direction, whereby the electric power generating current is reduced.

In this arrangement, the electric power generation of the induction machine can be controlled only by controlling the frequency based on the electric power storing voltage without measuring the actual RPM of the induction machine.

It is another object of the present invention to determine the exciting frequency by indirectly obtaining the RPM N of the induction type electric rotating machine without measuring the same, and by using the RPM N and a target slip value.

To achieve the above object., the electric power generation controlling means computes the RPM N of the induction machine by inputting the engine RPM Ne and multiplying the engine RPM Ne or the value obtained by multiplying the engine RPM Ne by the belt slip ratio k and further by the preset belt speed-increasing ratio. Although the RPM N is not a highly accurate value, at least the maximum possible RPM (with the minimum belt slip) and minimum possible RPM (with the maximum belt slip) of the induction type electric rotating machine at the present can be detected. Therefore, the exciting frequency can be determined by using the RPM N and a preferable slip value computed as a function of the RPM N, electric power storing voltage, etc. In addition, by determining the exciting frequency so that the exciting frequency is at the synchronous speed lower than the maximum possible RPM (with the minimum belt slip), the induction machine can be prevented from erroneously operating as an electric motor when operating as an electric power generator.

It is still another object of the present invention not to give any shock to the engine or to prevent the shortage of charging when the induction type electric rotating machine operates as an electric power generator without shifting to the electric motor side.

To achieve the above problem, the electric power generation controlling device sets the minimum value of the frequency to a value less than the synchronous frequency of the induction type electric rotating machine at the time when the engine is in idling when the machine operates as an electric power generator.

Furthermore, in the present invention, the electric power generation controlling means can detect the electric power generating current whereby the exciting frequency can be controlled the electric power generating current.

In this arrangement, when the electric power storing voltage is higher than the preset reference voltage and the electric power generating current is larger than the reference current in spite of no need of charging, for example, the electric power generating current can be reduced by increasing the exciting frequency and shifting the slip in the positive direction, or the electric power generating current can be lowered or reduced to zero by setting the on-duty ratio of the inverter to 0.

On the other hand, when the electric power storing voltage is lower than the preset reference voltage, and the electric power generating current is smaller than the reference current in spite of the need of charging, for example, the electric power generating current can be increased by reducing the exciting frequency and shifting the slip in the negative direction. In addition, by computing the voltage difference indicating by how much the electric power storing voltage is lower than the reference voltage, the electric power generating current can be changed according to the voltage difference (in a positive correlation to the voltage difference).

Furthermore, when the electric power generating current is smaller than the minimum current preset according to the characteristically of the induction type electric rotating machine, the exciting frequency can be increased based on the judgment that the slip is too proximate to 0, i.e., the electric motor side.

In this arrangement, the electric power generation of the induction machine can be controlled only by controlling the frequency based on the electric power generating current or the combination of the electric power generating current and electric power storing voltage without measuring actual RPM of the induction machine.

In the present invention, the electric power generation controlling means can detect the electric power generating voltage (voltage at the armature winding end) and control the frequency based on the electric power generating voltage.

In this arrangement, when the induction type electric rotating machine operates as an electric power generator, a high electric power generating voltage means a large electric power generating power current, while a low electric power generating voltage means a small electric power generating current. Based on this relation, the electric power generation can be controlled, even if the electric power generating current is replaced by the electric power generating voltage.

Furthermore, in the present invention, the electric power generation controlling means can compute the electric power generating current based on the voltage difference between the electric power generating voltage and the electric power storing voltage (in a positive correlation or in direct proportion to each other), whereby the electric current sensor can be omitted, which is greatly advantageous in simplifying the composition of the device.

Moreover, in the present invention, the electric power generation controlling means can compute the slip based on the detected electric power generating voltage and electric power generating current and compute the RPM of the induction type electric rotating machine from the slip and the exciting frequency. Therefore, the exciting frequency can be determined by using the RPM and the target slip, whereby the RPM of the induction type electric rotating machine can be computed and the electric power generation can be controlled without using any RPM sensor, which is greatly advantageous in simplifying the composition of the device.

Incidentally, it is, of course, possible to change the number of phases of the induction machine, the type of the rotor, i.e., squirrel-cage type or winding type, etc. in other compositions. Although it is preferable that a power transistor (bi-polar or MIS) should be used for inverter, other types of electric power semiconductor switch may be used. The inverter can operate as a rectifying circuit when the induction machine is used as an electric power generator.

Still furthermore, in the present invention, the electric power generation controlling means can shift the frequency of the controlling voltage of the inverter at the preset intervals and, at the same time, detect the variation of the quantity of state related to the electric power generating voltage before and after the shifting so that the frequency can be determined based on the variation and the quantity of state.

In this arrangement, the direction in which the frequency should be shifted can simply and exactly be determined.

That is, due to the well-known slip-electric power generating current characteristics between the electric power generating current and slip s of the induction type electric power generating device including single-peak characteristics that the electric power generating current reaches the peak value thereof in the region where the varying slip s is near 0, even if electric power is generated in the same state (with the same electric power generating current, battery voltage or electric power generating voltage as an example), quite different 2 regions of electric power generation exist as the operation state (efficiency and power factor as an example) of the induction type electric power generating machine. When the electric power generation region in which the absolute value of the slip s is smaller is assumed to be a high efficiency region and the electric power generation region in which the absolute value of the slip s is larger is assumed to be a low efficiency region, it is self-evident that the device should operate in the high efficiency region as much as possible. However, it is not clear in which region the device is operating only by monitoring the state of electric power generation of the induction type electric power generating device, e.g., the electric power generating current, the battery voltage or the electric power generating voltage.

To solve the above problem, in the present invention, a judgment is formed in which region (at which side from the peak value the frequency is) the device is operating by judging whether the level of electric power generation is increased or decreased at the time when the frequency is shifted in the specified direction in the preset cycle (when the slip s is shifted in the specified direction), and based on the judgment, the frequency, or the slip is varied in the direction to the preferable high efficiency region. As a result, the operation in the high efficiency region can simply be achieved.

It is to be noted that, as the relation between the slip s and the electric power generating current is known, as described above, the present slip s can be known by the quantity and direction of the variation of the electric power generating current due to the shifting of the frequency. On the other hand, the required level of the electric power generating current can be determined from the relation between the battery voltage and the target battery voltage (or the battery voltage and the consumed current).

Therefore, how much shifting of the frequency is required to obtain the necessary electric power generating current can be known based on the slip-electric power generating current characteristics and the present slip s.

Moreover, in the present invention, the engine RPM is detected, so that the electric power generation controlling means can change the inverter frequency determined by the shifting of the frequency based on the engine RPM.

In this arrangement, even if the RPM suddenly varies, the frequency can quickly follow the variation, whereby the delay in the response speed can be avoided.

Incidentally, when where the value obtained by multiplying the engine RPM by the preset pulley ratio is used as the RPM of the induction type electric power generating device, as the pulley ratio varies according to the type of the vehicle, the pulley ratio has to be stored in the nonvolatile memory of the controller in advance for each type of vehicle so as to achieve a high-precision control, which is disadvantageous in that the composition and manufacturing process of the controller are complicated.

In addition, as the slip of the belt looped over the pulley varies as the time passes, for example, it is possible that the estimated RPM of the induction type electric power generating device is inexact by the variation in the slip ratio of the belt.

It is still another object of the present invention to provide a method for estimating the RPM of the induction type electric rotating machine which can simply be applied to vehicles with any pulley ratio without using any nonvolatile memory.

To achieve the above object, the electric power generation controlling means has an RPM estimating means for estimating the RPM of the induction type electric rotating machine by the output state thereof after the engine starts, whereby the ratio of the RPM of the engine to the RPM estimated by the RPM estimating means can be computed and stored and the frequency of the inverter can be controlled based on the stored RPM ratio, the engine RPM and the electric power storing voltage, and as a result, the electric power storing voltage can be maintained within the preset range.

In this arrangement, the electric power generation control, can simply be achieved without using any RPM sensor, and furthermore, a device can be obtained which can exactly control the slip by precisely estimating the RPM of the induction type electric rotating machine in spite of the variation in the pulley ratio or the slip ratio of the belt.

On the other hand, in the present invention, the RPM estimating means can compute the RPM as a function of the frequency of the voltage generated in the armature winding during the OFF period of the inverter after the engine starts.

In this arrangement, the RPM of the induction type electric rotating machine can simply be estimated.

Furthermore, in the present invention, the RPM estimating means can command the inverter to supply electric current to at least one phase of the armature winding before estimating the RPM.

In this arrangement, the electric power generating voltage proportional to the RPM of the induction type electric rotating machine can easily be generated.

The RPM estimating means can compute the RPM as a function of the inverter frequency at the time when the quantity of state corresponding to the voltage at the DC side of the inverter reaches the preset value when the frequency of the inverter is varied.

In this arrangement, the RPM of the induction type electric rotating machine can simply be estimated.

That is, the quantity of state corresponding to the voltage at the DC end of the inverter (including the battery voltage) has a correlation with the state of the electric power generating current (the electric power generating current indicating the start of electric power generation= 0, for example). Therefore, the preset value of the slip S can be known from these relations. For example, the slip S is 0 at the start of the electric power generation, i.e., when the electric power generating current is 0. On the assumption that the exciting current of the induction type electric rotating machine is known, if the quantity of state corresponding to the voltage at the DC end of the inverter corresponding to the state in which the charging/discharging current is 0 is known, the slip S at this time can be known. As a result, the preset value of the slip S can be known from the preset quantity of state corresponding to the voltage at the DC end of the inverter.

Furthermore, the RPM of the induction type electric rotating machine is known from the inverter frequency at this time and the slip S, and the pulley ratio can be computed from the RPM of the induction type electric rotating machine and the engine RPM at this time. After that, the RPM of the induction type electric rotating machine can periodically be estimated from the pulley ratio and the periodically detected engine RPM.

In addition, in the present invention, the RPM estimating means can compute the RPM as a function of the inverter frequency at the time when the polarity of the output current at the DC side of the inverter is changed when the frequency of the inverter is varied.

In this arrangement, as the slip S is known (0, for example) at the time when the direction of the output current at the DC side of the inverter is changed (or when the output current is 0 except for the exciting current, or when the output current of the inverter is equal to the exciting current assuming that the exciting current is known), the RPM of the induction type electric rotating machine can be known from the slip S and the inverter frequency and the pulley ratio can be known from the engine RPM at this time. Therefore, the RPM of the induction type electric rotating machine can easily be estimated from the pulley ratio and the engine RPM thereafter.

As described above, according to the present invention, the frequency of the controlling voltage of the inverter is controlled based on the quantity of state related to the electric power generating voltage of the induction type electric rotating machine excluding the actually measured RPM of the induction type electric rotating machine but including the electric power storing voltage of the electric power storing means, so that the electric power storing voltage can be maintained within the reference range.

That is, as there is a known relation between the quantity of state related to the electric power generating voltage of the induction type electric rotating machine and the frequency, the electric power generating voltage can be changed by changing the frequency. In addition, as the quantity of state indicates the level of the electric power generation of the induction type electric rotating machine, the level of the electric power generation can be changed by changing the frequency based on the above quantity of state. Therefore, by changing the frequency according to the above quantity of state, the electric power generation can be controlled so that the electric power storing voltage can be maintained within the reference range.

Therefore, according to the present invention, the electric power generation control can be achieved without using any RPM sensor which has been regarded essential for conventional induction type electric rotating machines driven by an engine for vehicles, and an electric power generating device which can stably control electric power generation with a simple composition can be provided.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 17 is a block diagram illustrating a mode of computing RPM of the electric power generating device Na in engine controlling device 100.

DETAILED DESCRIPTION OF THE PRESENTLY PREFERRED EXEMPLARY EMBODIMENTS

Referring now to the appended drawings, description will be given to an embodiment of the induction machine type electric power generating device for vehicles according to the present invention.

Figure 1:
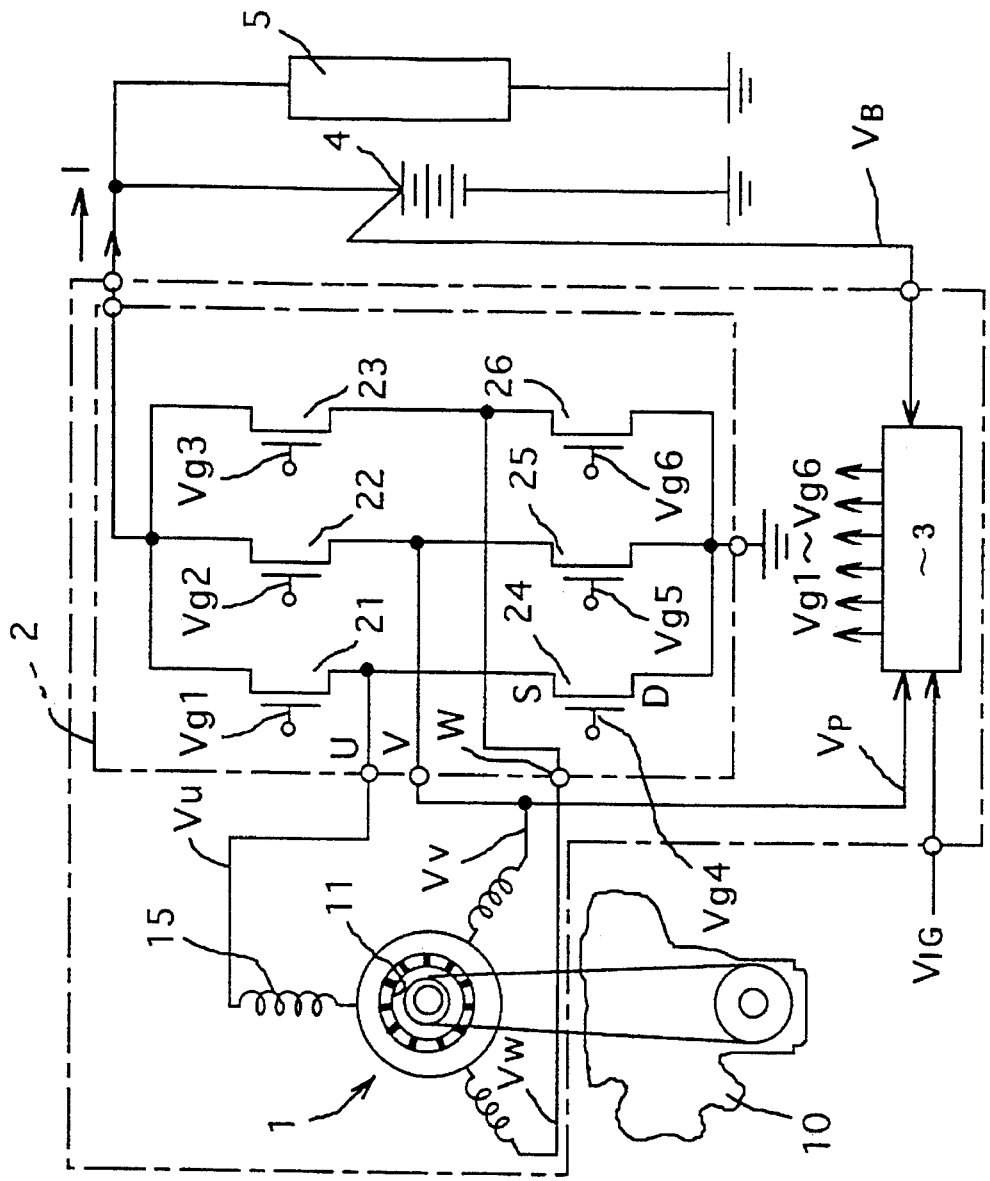
FIG. 1 is a block diagram illustrating a circuit of an electric power generating device of an embodiment according to the present invention.
Figure 2:
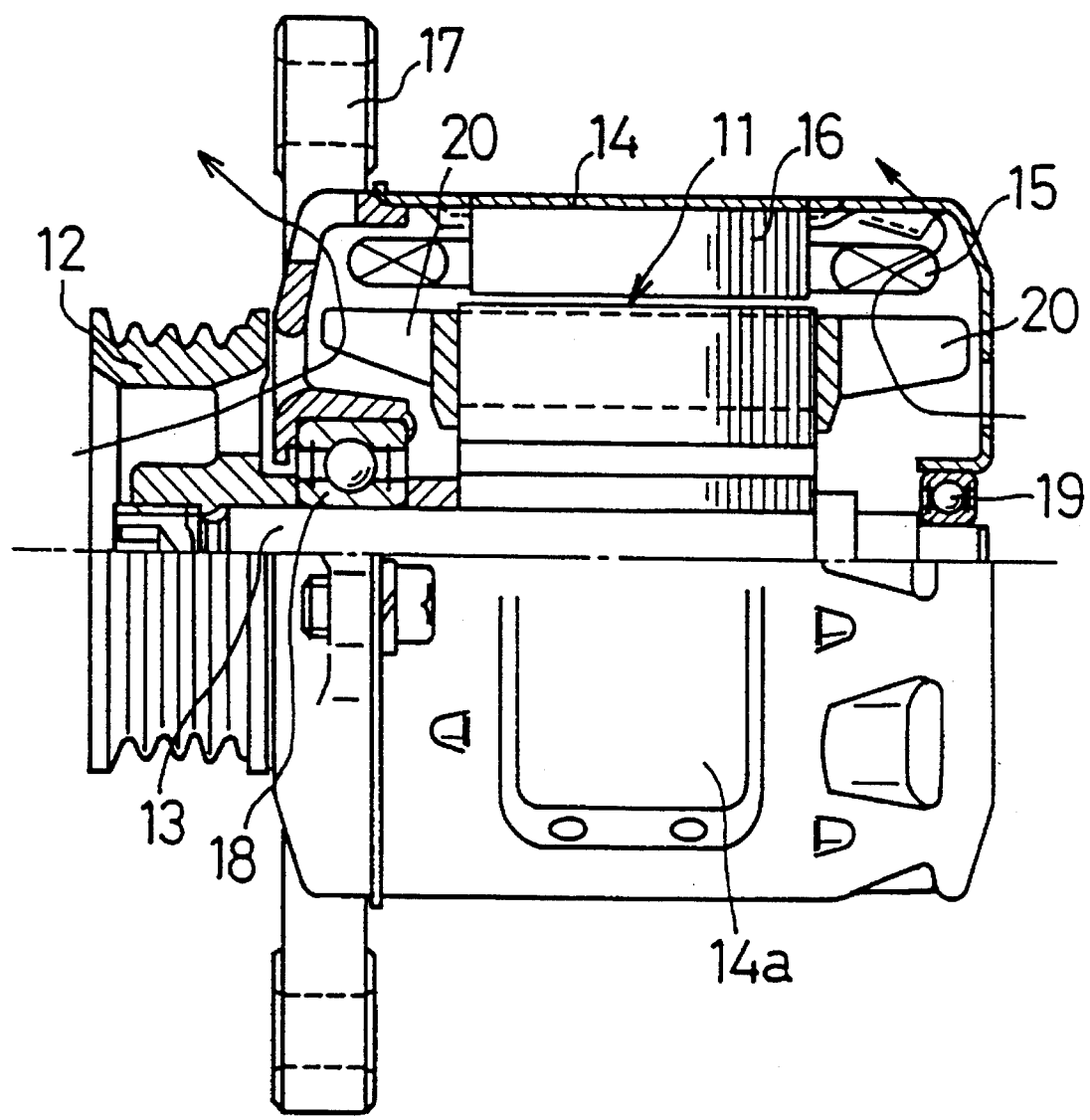
FIG. 2 is a schematic cross-sectional view illustrating induction machine 1.
Figure 3:
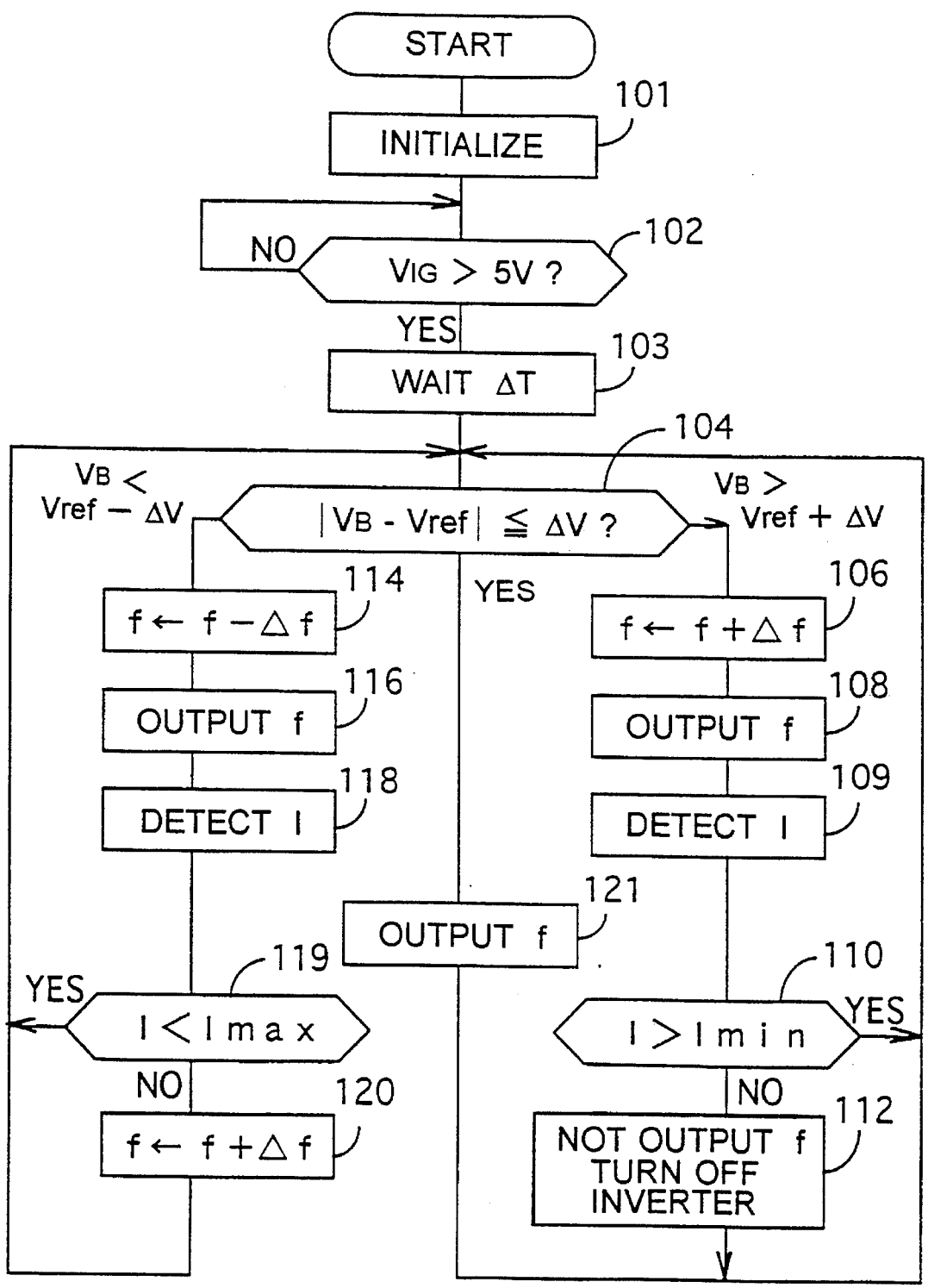
FIG. 3 is a flow chart showing an operation of controlling electric power generation in a first embodiment.

FIG. 1 shows a block diagram of a first embodiment, FIG. 2 is a schematic, half cross-sectional view thereof taken in the axial direction, and FIG. 3 is a flow chart of the electric power generation control operation thereof.

The electric power generating device for vehicles comprises an induction machine 1, a 3-phase inverter circuit ("inverter" as referred to in the present invention) 2 and a controller ("electric power generation controlling means" as referred to in the present invention) 3.

The induction machine 1 is composed of a squirrel-cage rotor type 3-phase induction machine which is speed-increasingly driven by a crank shaft of an engine 10 of a vehicle through a belt at a pulley ratio of approximately 4. Armature winding ends U, V and W of the induction machine are connected to the respective phases of the AC ends of the inverter 2.

The 3-phase inverter circuit 2 is composed of 6 sets of MOS power transistors (hereinafter referred to as "transistors") 21 through 26 in 3-phase bridge rectifier connection.

More specifically, the armature winding end U is connected to the connecting point (AC end) of a U-phase inverter circuit through which a transistor 21 composing a switch at the higher potential side and a transistor 24 composing a switch at the lower potential side are connected in series; the armature winding end V is connected to the connecting point (AC end) of a V-phase inverter circuit through which a transistor 22 composing a switch at the higher potential side and a transistor 25 composing a switch at the lower potential side are connected in series; and the armature winding end W is connected to the connecting point (AC end) of a W-phase inverter circuit to which a transistor 23 composing a switch at the higher potential side and a transistor 26 composing a switch at the lower potential side are connected in series. The higher potential DC end of the inverter circuit of each phases is connected to the higher potential end of a battery (electric power storing means) 4 and also to one end of vehicle electric loads 5, while the lower potential DC end of the inverter circuit of each phase, the lower potential end of the battery 4, and the other end of the vehicle electric loads 5 are grounded.

The controller 3 is composed of an electronic circuit to which the voltage $V_p$ of the armature winding end V ("electric power generating voltage" as referred to in the present invention), the terminal voltage $V_B$ of the battery 4 ("electric power storing voltage" as referred to in the present invention), and the working signal voltage of an ignition switch (not illustrated) $V_{IG}$ are inputted and from which the gate control voltages Vg1 through Vg6 of the 3-phase inverter circuit 2 are outputted. In this embodiment, the controller 3 is composed of a microcomputer device. The input interface of the microcomputer device is composed of an A/D converter for providing A/D conversion to these inputted voltages $V_p$, $V_B$ and $V_{IG}$ respectively, and the output interface of the same is composed of a power amplifier for providing power amplification to these outputted six pulse voltages Vg1 through Vg6 respectively. As the compositions themselves of these interfaces have been known to public, the description thereof will be omitted herein.

As illustrated in FIG. 2, the induction machine 1 includes a housing 14 rotatably supporting a shaft 13 with a squirrel-cage rotor 11 and a pulley 12 fittingly mounted thereon. To the inner periphery of the housing 14 is fixed an armature core 16 wound with a 3-phase armature winding 15 therearound.

Numeral 17 denotes a bracket for closing an opening of the housing 14 and also for mounting the induction machine 1 to a vehicle body. Numerals 18 and 19 denote bearings. In structure, the cooling air taken from intake openings made in an end wall of the housing 14 and the bracket 17 is discharged from discharge openings made in the peripheral wall of the housing 14 and the bracket 17 by the rotation of a fan 20.

In the predetermined position of the outer periphery of the housing 14 is fastened a box-like case 14a having an electromagnetic wave shielding function. Within this case 14a are disposed the 3-phase inverter circuit 2 and the controller 3.

In this embodiment, the idling revolution number (RPM) of the engine 10 is set to 600 rpm, and the maximum RPM of the same is set to 6,000 rpm. The 3-phase armature winging 15 is of an 8-pole type with a short-pitch concentrated winding of $\frac{2}{3}\pi$ [rad]. The armature core 16 has 24 slots, each slot, which is half-closed, has 6 conductors inserted thereinto.

Next, the operational principle of electric power generation will be described.

The engine 10 of the vehicle drives the squirrel-cage rotor 11 to rotate, while the controller 3 switches and controls the 3-phase inverter circuit 2 to apply the 3-phase AC voltage to each phase of the armature winding 15 of the induction machine 1. Then, the device operates as an electric motor or an electric power generator as is publicly known according to the synchronous speed Ns computed from the frequency f of the applied voltage and the slip s $\{s=(Ns - N)/N\}$ computed from the RPM N of the squirrel-cage rotor 11. It is to be noted that the device operates as an electric power generator when the Ns< N is established.

Now, the operation of forming the 3-phase AC voltage by switching and controlling the 3-phase inverter circuit 2 will be described. The voltage Vu of the 3-phase armature winding end U is a half-wave-long voltage in the positive phase when the transistor 21 is in the ON position and, on the other hand, is a half-wave-long voltage in the (alternatingly) negative phase when the transistor 24 is in the ON position. The voltage Vv of the 3-phase armature winding end V is a half-wave-long voltage in the positive phase when the transistor 22 is in the ON position and, on the other hand, is a half-wave-long voltage in the (alternatingly) negative phase when the transistor 25 is in the ON position. The voltage Vw of the 3-phase armature winding end W is a half-wave-long voltage in the positive phase when the transistor 23 is in the ON position and, on the other hand, is a half-wave-long voltage in the (alternatingly) negative phase when the transistor 26 is in the ON position. Therefore, the 3-phase AC voltage can be formed by switching the transistors 21 and 24, the transistors 22 and 25 and the transistors 23 and 26 respectively in the phases opposite to each other and by switching the transistors 21, 22 and 23 in the phases different by 120 degrees from each other.

Next, an example of the electric power generation control achieved by the controller 3 will be described referring to the flow chart of FIG. 3.

First, in Step 101, the initial setting is made to set the frequency of the gate control voltages Vg1 through Vg6 to 144 Hz, at which value the slip s is −10% when the engine is in idling.

Next, in Step 102, a judgement is formed whether or not an ignition switch (not illustrated) is in the ON position referring to whether or not the working signal voltage $V_{IG}$ is larger than the preset voltage (5 V in this case). When the judgment is negative, the next step is waited for.

On the other hand, when the judgement is positive, the device waits for a sufficient time required from the actuation of the ignition switch to the completion of the operation of the starter (0.5 second in this case) in Step 103 until the RPM of the engine is established.

Then, in Step 104, judgment is formed whether or not the battery voltage (electric power storing voltage) $V_B$ is within the range of the preset voltage ΔV from the reference voltage Vref. When the battery voltage $V_B$ is larger than the value "Vref+ΔV", it is judged that the electric power generation is not required, and then the preset value Δf is added to the exciting frequency f in Step 106 to control the inverter 2 in Step 108, and then the electric power generating current I is detected in Step 109.

Incidentally, the electric power generating current I may be detected by using an electric current sensor or by the drop in voltage with a low resistance used for detecting electric current. Here, however, the difference between the detected electric power generating voltage $V_p$ (here, the rectifying value of the $V_p$ is computed by using software, and value V corresponding to the battery voltage $V_B$ is obtained by multiplying the rectifying value of the $V_p$ by the. specified coefficient so that the rectifying value of the $V_p$ can be on the same scale as that of the battery voltage $V_B$) and the battery voltage $V_B$ is employed as the electric power generating current. Further details about this point will be described later.

In Step 110, it is judged whether or not the detected or computed electric power generating current I exceeds the minimum electric current value Imin. When the judgement is positive, it is judged that the electric power generating current is still too large, that is, the level of the electric current generation is still too high, the process returns to Step 104, and again in Step 106, the frequency is increased and the slip is shifted in the positive direction to reduce the electric power generating current.

On the other hand, when the judgement formed in Step 110 is negative, that is, when the electric power generating current I is equal to or smaller than the minimum electric current value Imin, it is judged that, although the electric power generating current has sufficiently been lowered, the battery voltage $V_B$ is still high, and the electric power generation should be stopped as the electric power generating current I and the slip should not be further reduced. Then, the 3-phase inverter circuit 2 is turned OFF (on-duty ratio: 0) in Step 112, and the process returns to Step 104.

it is needless to say that, even when the on-duty ratio is set to 0 in Step 112, the 3-phase inverter circuit 2 is tentatively actuated to detect electric current in Steps 118 and 119.

Here, taking Step 110 can prevent the slip from shifting in the positive direction and approaching the slip 0 in excess of the preset slip value by the increase in frequency in Step 106. As a result, the induction machine 1 can be prevented from erroneously being turned to the motor mode, providing a great effect. Furthermore, in this case, by setting the minimum electric current value Imin of the electric power generating current I (or the electric power generating voltage Vp) to that in the part with the slip value of the electric power generating efficiency is maximum or in the part to which the slip value slightly shifts in the positive direction from the slip value at which the electric power generating efficiency is maximum, the electric power generating operation is converged at the part with the maximum electric power generating efficiency is maximum as long as the situation permits, providing further effect.

In this embodiment, the electric power generating level is judged by the electric power generating current I in Steps 109 and 110. However, as the electric power generating current I (or the voltage difference "$V_p - V_B$") has a positive correlation with or proportional relationship to the electric power generating voltage $V_p$, it is also acceptable that the electric power generating level is judged by detecting the electric power generating voltage $V_p$ in Step 109 and judging in Step 110 whether or not the electric power generating voltage $V_p$ is larger than the preset minimum electric power generating voltage $V_p$min.

Next, when it is judged in Step 104 that the battery voltage $V_B$ is within the voltage range "Vref±ΔV", the frequency f is outputted as it is in Step 121.

On the other hand, if it is judged in Step 104 that the battery voltage $V_B$ is below the voltage range "Vref±ΔV", it is judged that charging and electric power generation are not sufficient. Then, the preset value Δf is subtracted from the exciting frequency f in Step 114, and the inverter 2 is controlled accordingly in Step 116. Next, the electric power generating current I is detected in Step 118, and a judgment is formed in Step 119 whether or not the electric power generating current I is smaller than the preset maximum electric current value Imax. When the judgement is positive, it is judged that the electric power generating current can further be increased, and the process returns to Step 104. Then, again in Step 114, the frequency is reduced and the slip is shifted in the negative direction to increase the electric current generating current. On the other hand, when the judgement formed in Step 119 is negative, that is, if the electric power generating current I is equal to or larger than the value Imax, it is judged that the electric power generating current is too large, and the exciting frequency f is slightly increased in Step 120, and the process returns to Step 104 to protect the induction machine 1.

According to the composition and operation described above, the electric power generation can stably be controlled without any complicated and highly precise slip control by means of high-precision speed sensors.

Particularly, the electric power generation control can simply and stably be provided to a high-speed induction machine type electric power generating device driven by an engine for vehicles which has high speed, high fluctuation, driven by belt at a high pulley ratio and has multiple poles ("multiple poles" means 6 or more poles in the induction machine).

Here, the initial exciting frequency $F_0$ is set to 144 Hz which is approximately 10% lower than the synchronous speed corresponding to the idling revolution. The aim for this setting is to prevent the electric power generating device from at least being turned to be an electric motor due to the slip made to be negative in the idling revolution, that is, to prevent an increase in engine torque due to the electric motor operation during idling. Another effect can be obtained that the electric power generating device can be controlled within the frequency range in which the efficiency does not significantly lower (the range in which no remarkable degradation of the efficiency is caused by the normal range of slip 0 to ±10%).

In this embodiment, although the controller 3 is composed of a microcomputer device, it is natural that the controller 3 may be composed of a hardware logic circuit or an analogue circuit.

It is also acceptable that an engine RPM sensor or an engine ignition signal is obtained from an engine control unit (engine controlling microcomputer device normally abbreviated as "E.C.U.") and used for controlling the frequency. That is, the engine RPM can be detected from the engine RPM sensor or the engine ignition signal, and by multiplying the RPM by the minimum belt slip ratio and the maximum belt slip ratio, the maximum possible speed Nmax and minimum possible speed Nmin of the induction machine 1 can be determined. Accordingly, by setting the synchronous speed $N_0$ obtained from the frequency of the gate control voltages Vg1 through Vg6 to be at least lower than the maximum possible speed Nmax, the slip s can be negative, that is, the device can be turned to be the electric power generating mode.

A case has been described above where the maximum possible speed Nmax and minimum possible speed Nmin of the induction machine 1 computed from the engine speed were determined to maintain the electric power generating mode. In addition, a case where the revolution number of the induction machine 1 computed in the above way is actively used will be described below.

Slip command value S of the induction machine 1 is computed from the function of the difference between the battery voltage $V_B$ and the reference value Vref thereof and the induction machine RPM N. Furthermore, the frequency of the inverter is determined from the slip command value S and the present induction machine RPM N to control the electric power generation to the optimum value.

In this case, accurate induction machine RPM can not be obtained due to some difference in the pulley size according to the type of the electric power generating device and the slip of the belt. However, by correcting the frequency of the inverter determined in the above way with the deviation of the actually measured value from preset value of the battery voltage, the device can exactly be controlled to the most suitable electric power generating state in a short time without using any dedicated RPM sensor for measuring the RPM of the induction machine 1, providing an excellent effect.

Furthermore, by setting the synchronous speed $N_0$ to be at least equal to or lower than the minimum possible speed Nmin, the electric power generating operation can be performed at a high efficiency.

In the above case, the maximum possible speed Nmax and minimum possible speed Nmin of the induction type electric power generating device computed from the engine speed are determined to maintain the electric power generating mode. Now, a case will be described where the revolution number of the induction type electric power generating device computed in the above way is actively used.

Slip command value S of the induction type electric power generating device is computed from the function of the difference between the battery voltage $V_B$ and the reference value Vref thereof and the revolution number N of the induction type electric power generating device.

Then, the frequency of the inverter is determined from the slip command value S and the present revolution number N of the induction type electric power generating device to control the electric power generation to the optimum state.

It is to be noted that the accurate revolution number of the induction type electric power generating device can not be detected from the engine speed due to the difference in the type of the electric power generating device, the diameter of the pulley, the slip of the belt, etc.

However, as described above, by determining the frequency of the inverter by the deviation of the actually measured value from the preset value of the battery voltage, the device can exactly be controlled to the optimum electric power generating state in a short time without using any dedicated RPM sensor for measuring the revolution number of the induction type electric power generating device.

Figure 4:
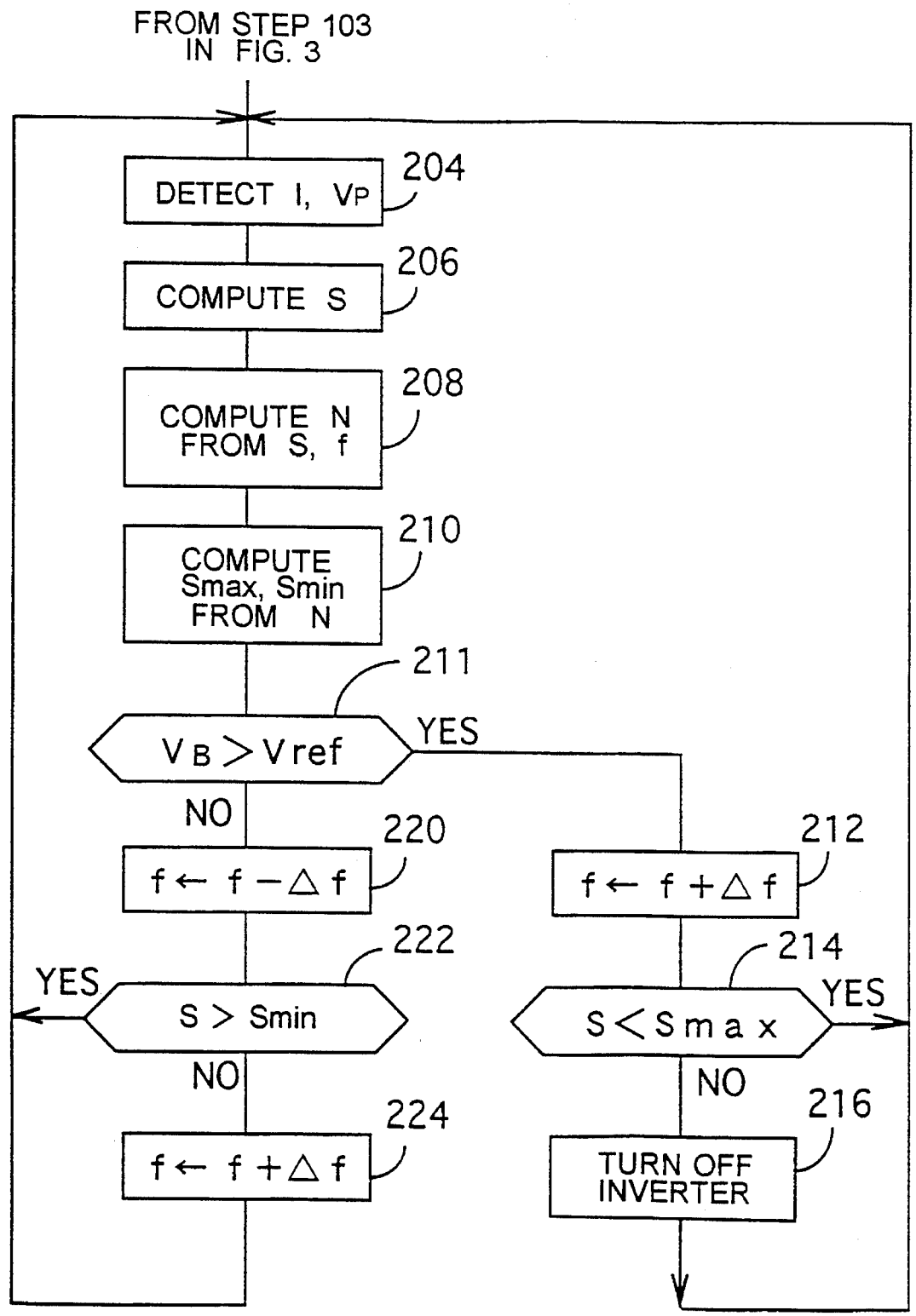
FIG. 4 is a flow chart showing an operation of controlling electric power generation in a second embodiment.

Now, a second embodiment will be described referring to FIG. 4.

Figure 5A:
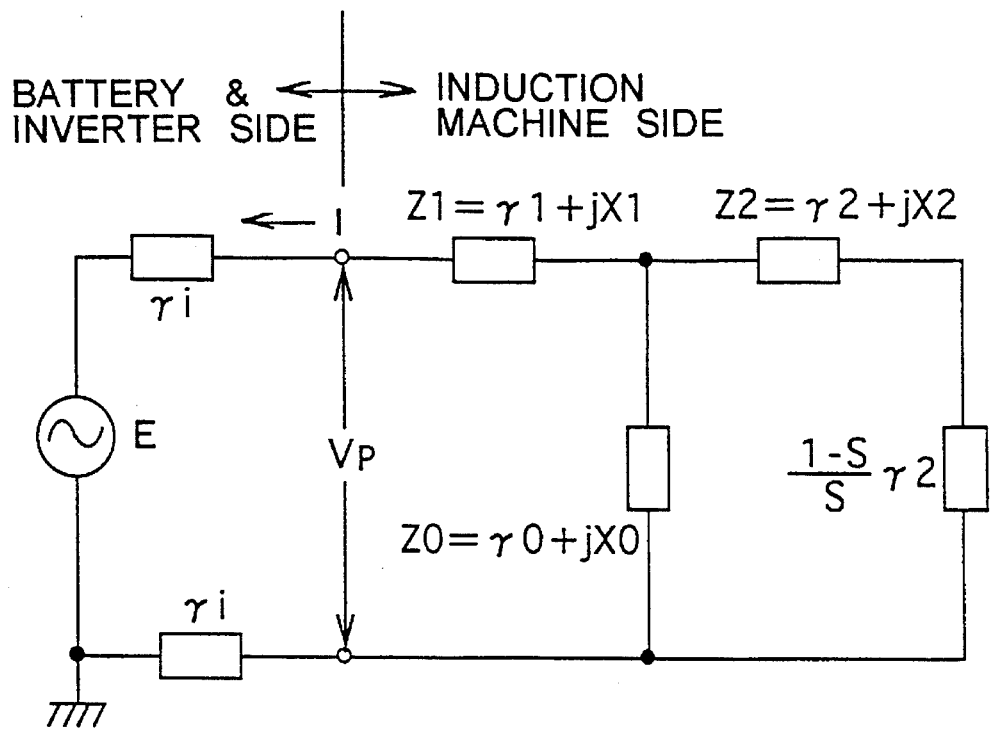
FIGS. 5(a) and 5(b) show diagrams illustrating the single-phase equivalent circuits of induction machine 1.
Figure 5B:
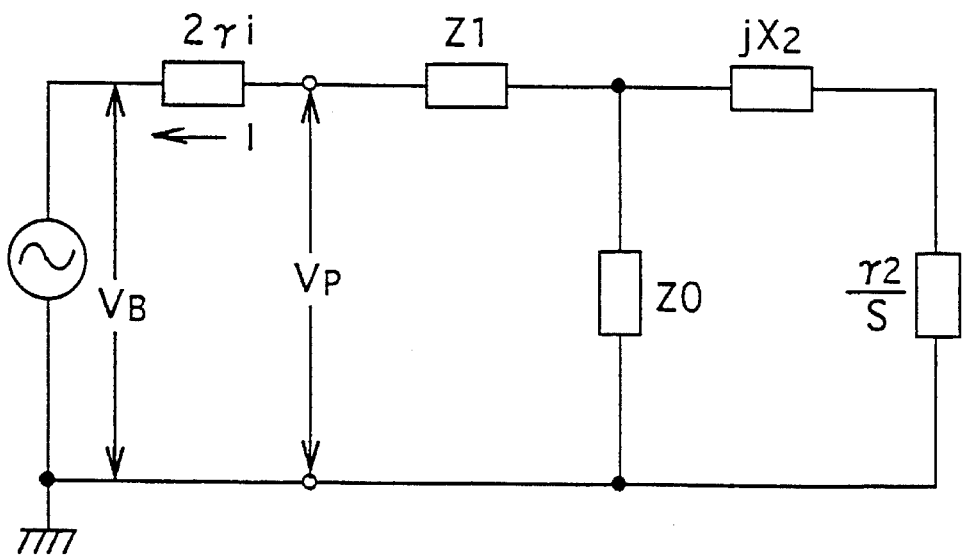

Prior to the description of the operational principle of this embodiment, the diagram of a single-phase equivalent circuit of the induction type electric power generating device is illustrated in FIGS. 5(a) and 5(b). These two figures differently illustrates the same circuit.

In FIG. 5(a), E denotes an assumption that the battery voltage $V_B$ is an AC sinusoidal electric power source. Two resistances ri are the resistance components of the battery 4 and the inverter 2. Z1 stands for the impedance of the armature coil (primary side), r1 denotes the resistance amount thereof, and x1 denotes the reactance amount thereof. Z2 denotes the impedance of the rotor side (secondary side), r2 denotes the resistance amount thereof, and x2 denotes the reactance amount thereof. Z0 denotes the exciting impedance, r0 denotes the resistance amount thereof, and x0 denotes the reactance amount thereof. As the slip s is negative, electric current flows from the induction machine 1 to the battery side. Theoretically, as the ri is known, the detection can be made according to the following equation: Electric power generating current I= (Electric power generating voltage $V_p$ (scale converted) - Battery voltage $V_B$)/2ri.

The electric power generating current I can easily be computed as the functional value of the values $V_p$, Z0, Z1 and Z2 from the equivalent circuit illustrated in FIGS. 5(a) and 5(b). As the values except for the slip s, the electric power generating volume $V_p$ and the electric power generating current I are known and constant, the slip s can easily be computed from the values $V_p$ and I based on the equivalent circuit illustrated in FIGS. 5(a), 5(b). Furthermore, by storing the map indicating the relation among the values $V_p$, I and s in the microcomputer, the slip s can easily be searched from the values $V_p$ and I.

For reference, if the value Z0 is omitted to simplify the computation and the power factor is also ignored in FIGS. 5(a), 5(b), the above equation can be reduced to: $I=V_p/(r1+j(x1+x2)+r2/s)$. From this equation, it is understood that the electric power generating current I increases when the value s shifts from 0 in the negative direction and, on the other hand, the electric power generating current I decreases when the value s approaches to 0 from the negative direction. However, as there is a high efficiency electric power generation range in the zone where the value s is near 0, it is preferable that the slip s should be set within the negative value range near 0 (−5% to −15% as an example) when the electric power current I can be further increased. It is also preferable that the exciting frequency f should be increased to bring the slip s near 0.

Now, the operational principle of electric power generation control of this embodiment will be described referring to FIG. 4.

First, the same processes up to Step 103 as those of the first embodiment, which is shown in FIG. 3, are followed, and then the electric power generating current I and the electric power generating voltage $V_p$ are detected in Step 204 in the same way as the first embodiment.

Next, the present value Sn of the slip s is searched by computation in Step 206 as described above, and the revolution number N of the induction machine 1 is computed from the searched slip Sn and the present exciting frequency value fn in Step 208. From the value N, the allowable maximum slip value (the code is negative, the absolute value is the minimum value, −8% in this case) Smax and the allowable minimum slip value (the code is negative, the absolute value is the maximum value, corresponding to the maximum value of the electric power generating current I) Smin are computed in Step 210.

Then, the battery voltage $V_B$ is compared with the reference voltage Vref in Step 211. When the battery voltage $V_B$ exceeds the reference voltage Vref, it is judged that the electric power generation is not required, and the preset value Δf is added to the exciting frequency f in Step 212 to control the inverter 2. Then, the slip s is computed from the newly obtained exciting frequency f and the revolution number N obtained in Step 208, and a judgment is formed in Step 214 whether or not the computed slip s is lower than the value Smax. When the judgment is positive, it is judged that the exciting frequency f can further be increased, and the process returns to Step 204. When the judgment is negative, the inverter is turned OFF.

On the other hand, when the battery voltage $V_B$ is equal to or less than the reference voltage Vref in the comparison made in Step 211, it is judged that the electric power generation should be reinforced, and the preset value Δf is subtracted from the exciting frequency f in Step 220 to control the inverter 2. Then, the slip s is computed from the newly obtained exciting frequency f and the revolution number N obtained in Step 208, and a judgment is formed in Step 222 whether or not the computed slip s is equal to or larger than the value Smin. When the judgment is positive, it judged that the exciting frequency f can further be reduced, and the process returns to Step 204. When the judgment is negative, it is judged that further decrease in the exciting frequency f, that is, further shifting of the slip s in the negative direction, may cause prohibited increase in the electric power generating current I, and the preset value Δf is added to the exciting frequency f in Step 224 to control the inverter 2, and then the process returns to Step 204.

Also in this embodiment, it is needless to say that, even when the on-duty ratio is set to 0 in Step 216, the 3-phase inverter circuit 2 is tentatively actuated to detect the electric power generating voltage $V_p$ and the electric power generating current I in Step 204, for example.

According to the composition and operation described above, the electric power generation can stably be controlled without any complicated and highly precise slip control by means of high-precision speed sensors.

Incidentally, when the slip s is computed from the electric power generating current I and the electric power generating voltage $V_p$ as described above, as the voltage $V_p$ should preferably be in a sinusoidal waveform, it is preferable that PWM control should be applied to the inverter 2 so that the duty ratio can be an instantaneous value of the sinusoidal wave so as to approximate the rectangular pulse voltage to a sinusoidal waveform.

Figure 6:
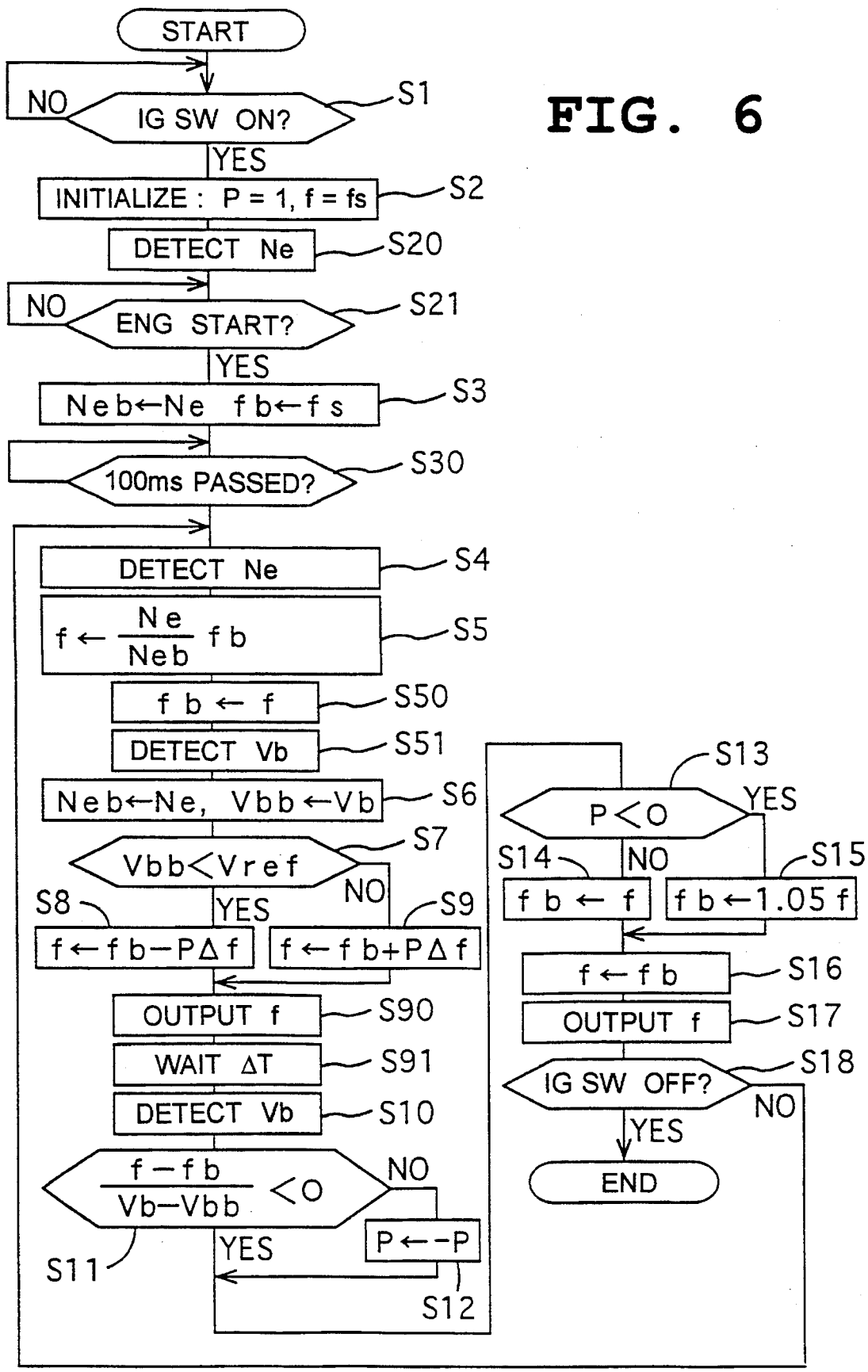
FIG. 6 is a flow chart showing an operation of controlling electric power generation in a third embodiment.

A third embodiment of the electric power generating device for vehicles according to the present invention will be described with reference to the flow chart of FIG. 6.

First, when the turning ON of the key switch is detected in Step S1, the initial setting is made in Step S2. Here in this initial setting, the proportional constant P is set to 1 and the present value (output value) of the preset inverter frequency, f, is set to initial setting frequency value fs.

Figure 8:
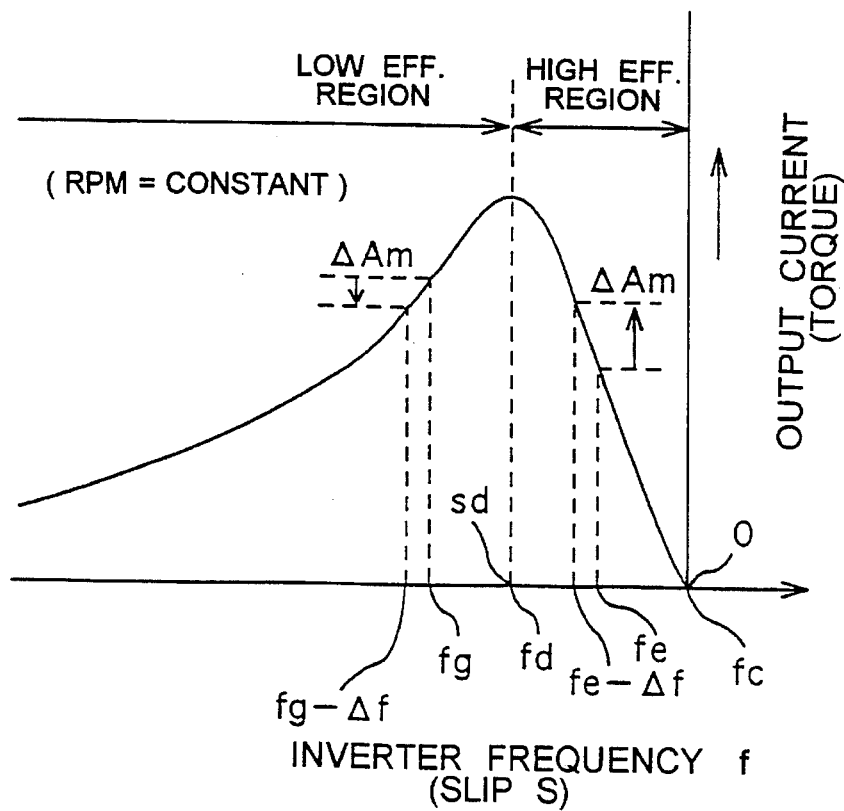
FIG. 8 is a characteristic diagram showing the characteristics of electric power generation of induction machine 1.

It is extremely preferable that the working point of the electric power generating device at the engine speed immediately after the engine starts should be within the high efficiency range (region between points fd and fc in the frequency-output current characteristics illustrated in FIG. 8). Therefore, the value fs is set to the preset value within the range from fd to fc with respect to the preset engine speed immediately after the engine starts. Here, the value fd is the inverter frequency value at which the slip s is sd with respect to the preset engine speed immediately after the engine starts, and the value fc is the inverter frequency value at which the slip s is 0, that is, the synchronous frequency. However, in FIG. 8, the value fd is the frequency of the inverter at which the output current is at the peak value thereof, and the revolution number (RPM) of the induction type electric power generating device is constant.

Next, in Step S20, the engine speed Ne is detected. In Step S21, the device waits until it is confirmed that the engine start has been completed based on the engine speed Ne, and when the completion of the engine start is confirmed, the process proceeds to Step S3. Here, the completion of the engine start is confirmed by confirming that the engine speed Ne has reached the above preset engine speed immediately after the engine starts (400 rpm). Of course, any other known method can be employed for confirming the completion of the engine start.

In Step S3, the engine speed Ne equal to the above engine speed immediately after the engine starts is stored as previous engine speed value (stored value) Neb, and the above initially set frequency fs is stored as previous inverter frequency value (stored value) fb.

In Step 30, the device waits for the preset time (100 ms as an example), and then in Step S4, the engine speed Ne is detected again as the present value.

Next, in Step S5, by multiplying the previous inverter frequency value fb by the ratio of the present value Ne to the previous value Neb of the engine sped (Ne/Neb), the previous inverter frequency value fb is shifted in proportion to the above ratio of the variation of the engine speed (Ne/Neb) and the shifted value is outputted to the inverter as the present inverter frequency value f and the present inverter frequency value f obtained after the above shifting is updated as the preset value fb (Step S50). In this way, the inverter frequency can roughly follow the variation in the engine speed.

Figure 7:
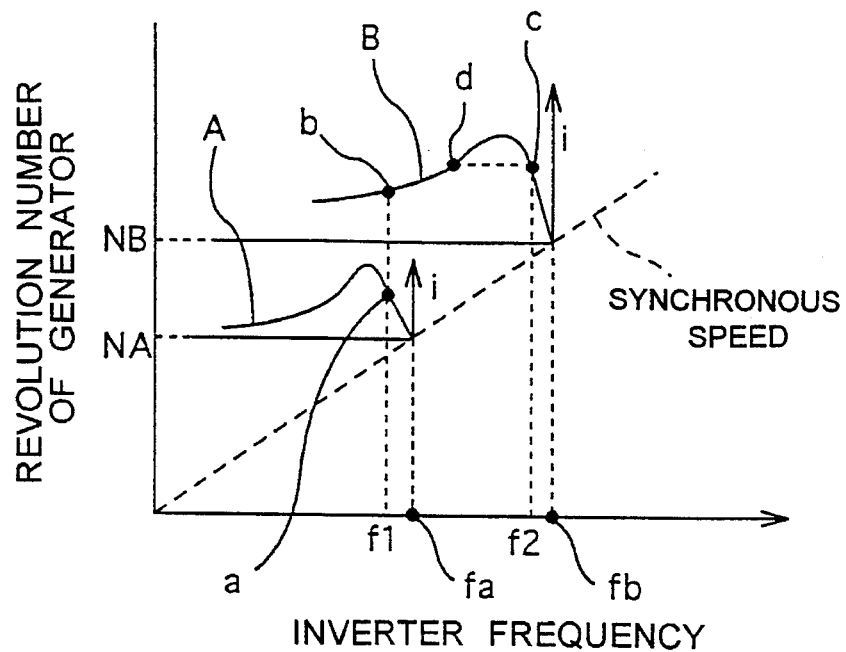
FIG. 7 is a characteristic diagram showing the electric power generating characteristics of induction machine 1.

What Step S5 means will further be described referring to FIG. 7. FIG. 7 illustrates changes in the state of the induction type electric power generating device when the revolution number thereof from the value NA to the value NB.

When the slip-electric power generating current characteristics when the revolution number of the electric power generating device is at the value NA are expressed as A, the slip-electric power generating current characteristics when the revolution number of the electric power generating device is at the value NB are expressed as B, and the inverter frequency is expressed as f1, the output current i is the value that corresponds to point a.

If the revolution number of the electric power generating device suddenly increases to the value NB, the slip-electric power generating current characteristics turn to be B, and as a result, the slip s shifts from the high efficiency region to the low efficiency region. When the inverter frequency is gradually increased from f1 to f2 to obtain a value equal to the output current or torque at the point a, the inverter frequency stops at the point d on the property B and does not reach the working point c at which a value equal to the output current or torque at the working point a in the high efficiency region can be obtained.

Then, reaching the working point c is speedily achieved by making the inverter frequency f directly jump from the working point a to the operation point c at a time by a proportional shifting thereof according to the variation ratio of the engine speed Ne obtained in Step S5. Therefore, the inverter frequency f2 after the above shifting is f1× NA/NB in FIG. 7, and the present inverter frequency value (command value) f after the above shifting is fb×Ne/Neb in FIG. 6.

That is, considering that the ratio of the engine speed to the revolution number of the electric power generating device is expressed as a pulley ratio which is constant, the ratio of NA to NB of the electric power generating device is equal to the ratio of the engine speeds. Therefore, even if the engine speed varies, by changing the inverter frequency according to the variation ratio of the engine speed, the slip s of the electric power generating device can be controlled to a constant value from the known equation of the slip s.

In the next step, Step S51, the present battery voltage value Vb is detected.

In Step S6, the present engine speed value Ne detected in Step S4 is stored as previous engine speed value Neb, and the battery voltage Vb detected in Step S51 is stored as previous battery voltage value Vbb.

In Step S7, the previous battery voltage value Vbb is compared with the preset reference voltage Vref. When the value Vbb is smaller than the value Vref, it is assumed that the working point presently exists in the high efficiency range, and the process proceeds to Step S8 to make the present inverter frequency value f by reducing the previous inverter frequency value fb by PΔf. On the other hand, when the value Vbb is equal to or larger than the value Vref, it is assumed that the working point currently exists in the high efficiency region, and the process proceeds to Step S9 to make the present inverter frequency value f by increasing the previous inverter frequency value fb by PΔf. Then, the present value f is outputted in Step S90, and after waiting for the preset time ΔT, the process proceeds to Step S10 to detect the present battery voltage value Vb again.

In Step S11, the relation of the increase or decrease in the battery voltage Vb to the shifting of the inverter frequency made in Steps S8 and S9 described above is judged.

That is, when the results of the calculation (f - fb)/(Vb - Vbb) are negative, it means that the working point of the electric power generating device exists in the high efficiency region of FIG. 8 (the frequency and the output current are in negative correlation). On the other hand, when the results of the same calculation are positive, it means that the working point exists in the low frequency region (the frequency and the output current are in positive correlation).

Therefore, when the results of the calculation are negative, i.e., the judgement in Step S11 is YES, the process proceeds directly to Step S13, and then the results of the same calculation are positive, i.e., the judgement in Step S11 is NO, the proportional constant P is multiplied by −1 to reverse the increase/decrease direction of the frequency in next Steps S8 and S9, and then the process proceeds to Step S13.

In Step S13, a judgement is formed whether or not the value P is negative. When the judgment is NO, i.e., the value P is not negative, it is judged that the working point exists in the high efficiency region, and the present inverter frequency value f computed in Step S8 or S9 is stored as the previous value fb (Step S14). On the other hand, when the judgment is YES, i.e., the value P is negative, it is judged that the working point exists in the low efficiency region, and the value obtained by multiplying the present inverter frequency value f computed in Step S8 or S9 by 1.05 is stored as previous value fb (Step S15). Then, the previous value fb stored in Step S16 is outputted to the inverter as the present value f to be outputted in Step 17.

Here, the present inverter frequency value f computed in Step S8 or S9 is multiplied by 1.05 for accelerating the shifting as the control range of the low efficiency region is wider than that of the high efficiency region.

Next, a check is made whether or not the ignition switch is in the OFF position (Step S18). When the switch is not in OFF position, the process returns to Step S4, and when the switch is in the OFF position, the routine is finished.

By repeating a series of the steps, Steps S4 through S15, while the ignition switch is in the ON position, the battery voltage can be maintained to the reference voltage. Here, Steps S4 through S6 (for switching the frequency according to the engine speed) are added for improving the control accuracy and responsive, and therefore and can be omitted.

As described above, this embodiment provides an excellent effect that, without using any RPM sensor for the electric power generating device, the working point of the electric power generating device can be searched and thereby the inverter frequency to be command next can suitably be determined by learning the response of the battery voltage $V_B$ at the time when the frequency of the inverter is varied.

In the above embodiment, the response of the battery voltage $V_B$ when the frequency is varied is learned, however, the same effect can also be obtained by learning the response of the output current and output voltage of the electric power generating device.

Figure 9:
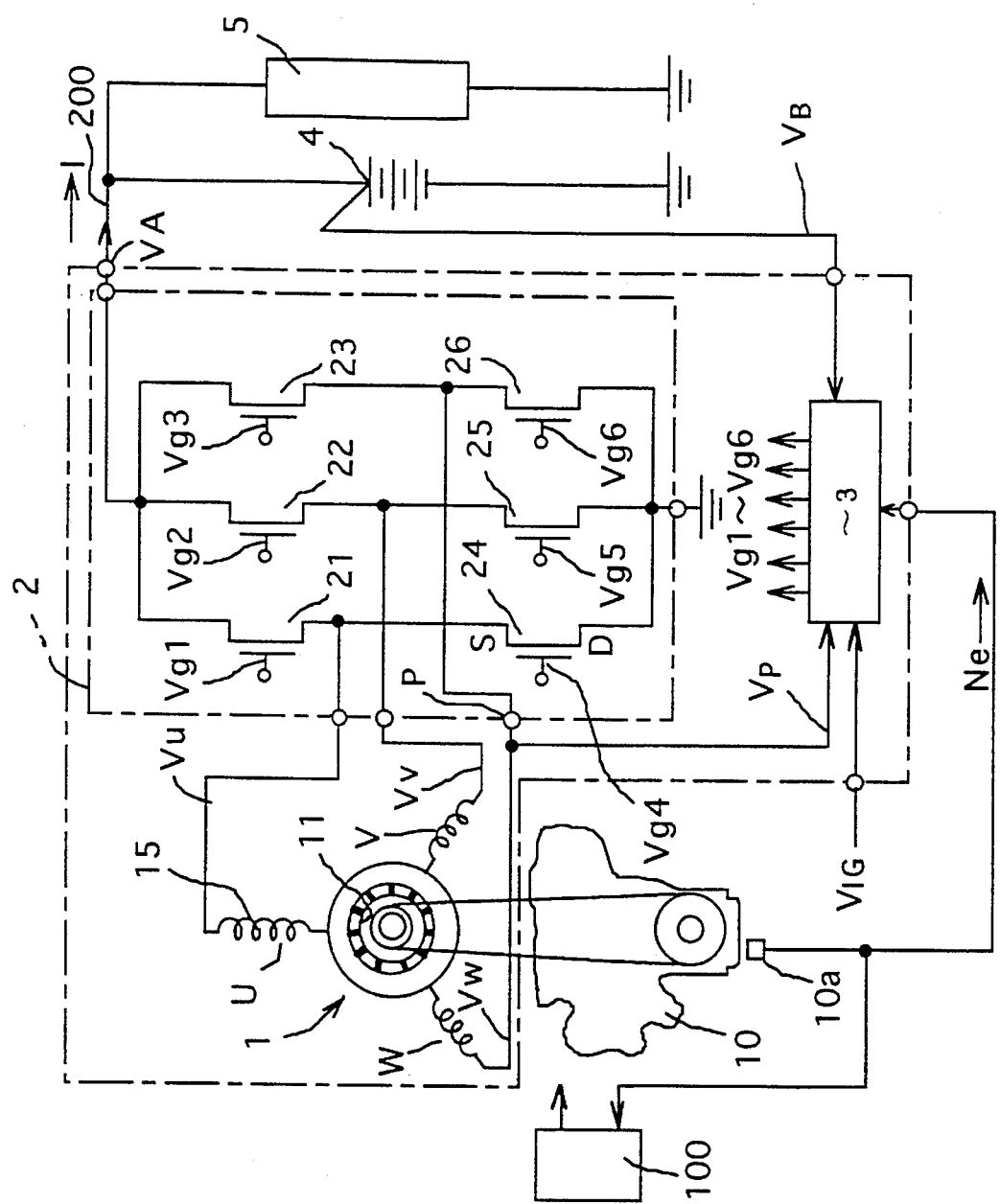
FIG. 9 is a block diagram illustrating a fourth embodiment according to the present invention.
Figure 10:
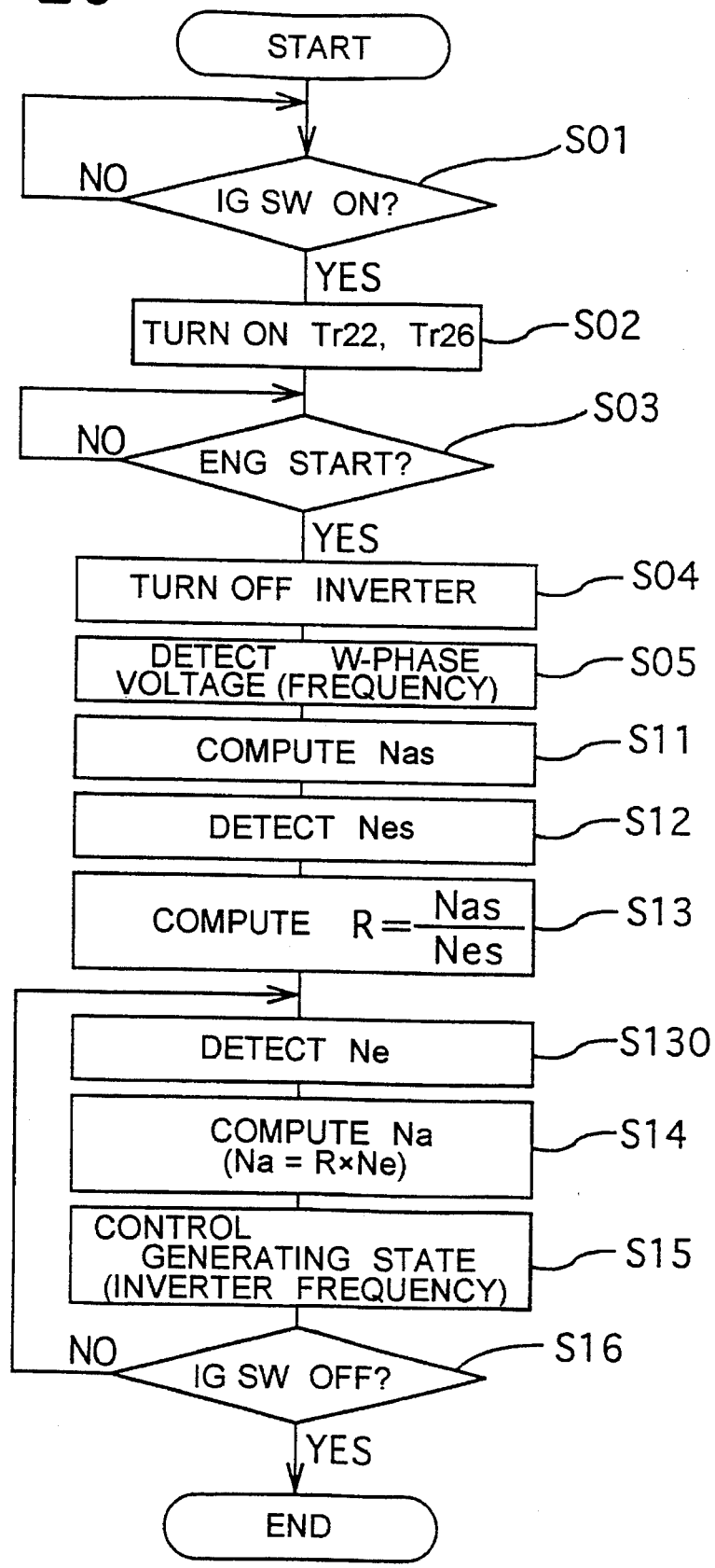
FIG. 10 is a flow chart showing a controlling operation in the fourth embodiment.

Next, description will be given to a fourth embodiment of an induction type electric power generating device for vehicles according to the present invention. FIG. 9 is a block diagram illustrating the fourth embodiment, and FIG. 10 is a flow chart of the operation for controlling the electric power generation thereof.

The electric power generating device for vehicles comprises an induction machine 1, a 3-phase inverter circuit 2 and a controller 3.

The induction machine 1 is composed of a squirrel-cage rotor type 3-phase induction machine which is speed-increasingly driven by a crank shaft of an engine 10 of a vehicle through a belt at a pulley ratio of approximately 4. Armature winding ends of the respective U, V and W phase of the induction machine are connected to the respective phases of the AC ends of the inverter 2.

The 3-phase inverter circuit 2 includes six MOS power transistors 21 through 26 in 3-phase bridge rectifier connection.

More specifically, the armature winding end of U phase is connected to the connecting point (AC end) of a U-phase inverter circuit through which a transistor 21 composing a switch at the higher potential side and a transistor 24 composing a switch at the lower potential side are connected in series; the armature winding end of V phase is connected to the connecting point (AC end) of a V-phase inverter circuit through which a transistor 22 composing a switch at the higher potential side and a transistor 25 composing a switch at the lower potential side are connected in series; and the armature winding end of W phase is connected to the connecting point (AC end) of a W-phase inverter circuit to which a transistor 23 composing a switch at the higher potential side and a transistor 26 composing a switch at the lower potential side are connected in series. The higher potential DC end of the inverter circuit of each phases is connected to the higher potential end of a battery (electric power storing means) 4 and also to one end of vehicle electric loads 5, while the lower potential DC end of the inverter circuit of each phase, the lower potential end of the battery 4 and the other end of the vehicle electric loads 5 are grounded.

The controller 3 is composed of an electronic circuit to which the voltage of the V-phase armature winding end ("electric power generating voltage" as referred to in the present invention), $V_p$, the terminal voltage of the battery 4 ("electric power storing voltage" as referred to in the present invention), $V_B$ and the working signal voltage of an ignition switch (not illustrated) $V_{IG}$ are inputted and from which the gate control voltages Vg1 through Vg6 of the 3-phase inverter circuit 2 are outputted. In this embodiment, the controller 3 is composed of a microcomputer device. The input interface of the microcomputer device is composed of an A/D converter for providing A/D conversion to these inputted voltages $V_p$, $V_B$ and $V_{IG}$ respectively, and the output interface of the same is composed of a power amplifier for providing power amplification to these outputted six pulse voltages Vg1 through Vg6 respectively. As the compositions themselves of these interfaces have been known to public, the description thereof will be omitted herein.

Next, the operational principle of electric power generation will be described.

The engine 10 of the vehicle drives the squirrel-cage rotor 11 to rotate, while the controller 3 switches and controls the 3-phase inverter circuit 2 to apply the 3-phase AC voltage to each phase of the armature winding 15 of the induction machine 1. Then, the device operates as an electric motor or an electric power generator as is publicly known according to the synchronous speed Ns computed from the frequency f of the applied voltage and the slip S computed from the revolution number N of the squirrel-cage rotor 11. It is to be noted that the device operates as an electric power generator when the Ns<N is established.

Now, the operation of forming the 3-phase AC voltage by switching and controlling the 3-phase inverter circuit 2 will be described. The voltage Vu of the U-phase armature winding end is a half-wave-long voltage in the positive phase when the transistor 21 is in the ON position and, on the other hand, is a half-wave-long voltage in the (alternatingly) negative phase when the transistor 24 is in the ON position. The voltage Vv of the V-phase armature winding end is a half-wave-long voltage in the positive phase when the transistor 22 is in the ON position and, on the other hand, is a half-wave-long voltage in the (alternatingly) negative phase when the transistor 25 is in the ON position. The voltage Vw of the W-phase armature winding end is a half-wave-long voltage in the positive phase when the transistor 23 is in the ON position and, on the other hand, is a half-wave-long voltage in the (alternatingly) negative phase when the transistor 26 is in the ON position. Therefore, the 3-phase AC voltage can be formed by switching the transistors 21 and 24, the transistors 22 and 25 and the transistors 23 and 26 respectively in the phases opposite to each other and by switching the transistors 21, 22 and 23 in the phases different by 120 degrees from each other.

Next, an example of the electric power generation control (inverter frequency control) achieved by the controller 3 will be described referring to the flow chart of FIG. 10.

After the ignition switch is turned ON in Step S01, the transistors 23 and 25 are turned ON before starting the engine to allow DC current to flow from the battery 4 to the W phase and V phase of the armature winding of the induction machine 1. As a result, the rotor of the induction machine 1 is magnetized. In this embodiment, although the induction machine employs star connection, Δ connection is also acceptable. In the case of the Δ connection, when the W phase is energized in the forward direction, the V phase and U phase are also energized but in the opposite direction. When the specified part of the preset armature winding is energized with DC current in this way, the rotor core is magnetized accordingly. When the induction machine 1 is of 2-pole type, both the poles of the rotor 11 is magnetized. Normally, the rotor 11 of the induction machine 1 is slightly magnetized by the excitation of the inverter in electric power generating operation. However, magnetizing operation in Step S01 is performed in preparation for the reduction of the magnetizing force of the rotor 11 caused by the stoppage of the vehicle for a long time, for example. Here, it is preferable that magnetization of Step S01 should be performed only for a short time (100 mS as an example) to minimize the discharge from battery 4. It is possible to omit the magnetization of Step 01 when the magnetizing amount of the rotor 11 is enough to detect the voltage of the armature coil 15 of Step S05 (described later).

Next, in Step S03, the device waits until the engine start is detected (by the fact that the engine speed Ne has reached the preset value). When the speed has reached the preset value, all the transistors 21 through 26 of the inverter 2 are turned OFF in Step S04.

Next, in Step S05, the frequency of the voltage generated in the armature coil is measured.

Figure 11:
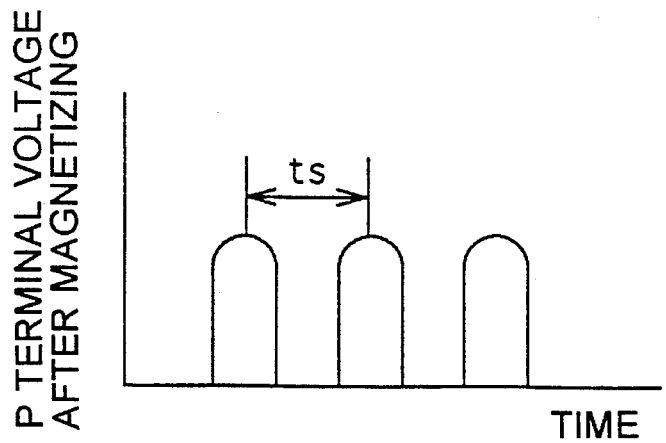
FIG. 11 is a timing chart showing the waveform of the P terminal voltage after a rotor is magnetized in the fourth embodiment.

To be more specific, when the induction machine 1 is in rotation, the voltage waveform illustrated in FIG. 11 is generated at the armature coil end P by the residual magnetic flux of the rotor 11. When the induction machine 1 is composed of n pairs of poles, n pairs of N-S pairs are generated in the rotor 11 by the operation of Step S02, and as a result, the number of the voltage pulses generated in the armature winding in rotation is "Na/60×n/sec" (where Na is the revolution number (rpm) of the induction machine 1). That is, when ts is the measured value of the voltage period of the P terminal after the engine starts, the revolution number of the induction machine 1 at this time is expressed by the equation "Nas=60/n×ts (rpm)". Based on the relationship, the current induction machine speed Nas is computed in Step S11, and then, in Step S12, the current engine speed Nes is read from the RPM sensor 10a attached to the engine. Here, the RPM sensor 10a is a sensor used for controlling the fuel injection rate of the engine, for example, and attached for every electronically controlled vehicle.

Next, In Step S13, the ratio of the induction machine speed Nas computed in Step S11 to the engine speed Nes, i.e., R=Nas/Nes, is computed and stored in the controller 3. As the ratio R shows a revolution number ratio (which corresponds to pulley ratio) of the induction machine 1 to the engine 10 which drives the induction machine 1 can be obtained by a series of the operations described above, by monitoring the engine speed, the revolution number of the induction machine 1 can exactly be detected before controlling the frequency of the inverter without using any dedicated RPM sensor for the induction machine.

That is, in Step S130, the engine speed Ne is detected. Next, in Step S14, based on the detected engine speed Ne, the revolution number Na of the electric power generating device 1 is computed from the equation, Na= RNe, (where Na is the revolution number of the induction machine, Ne is the engine speed, and R is the RPM ratio computed in the previous Step S13) to prepare for the electric power generating control to be performed in Step S15.

Next, in Step S15, the inverter frequency f is determined from the battery voltage Vb (=$V_B$), the electric power generating device speed Na and the slip command value s, and the electric power generation is controlled. Subsequently, whether or not the ignition switch is in the OFF position is judged (Step S16), and then a series of the steps, Steps S130 through S16, is repeated while the ignition switch is in the ON position.

Figure 12:
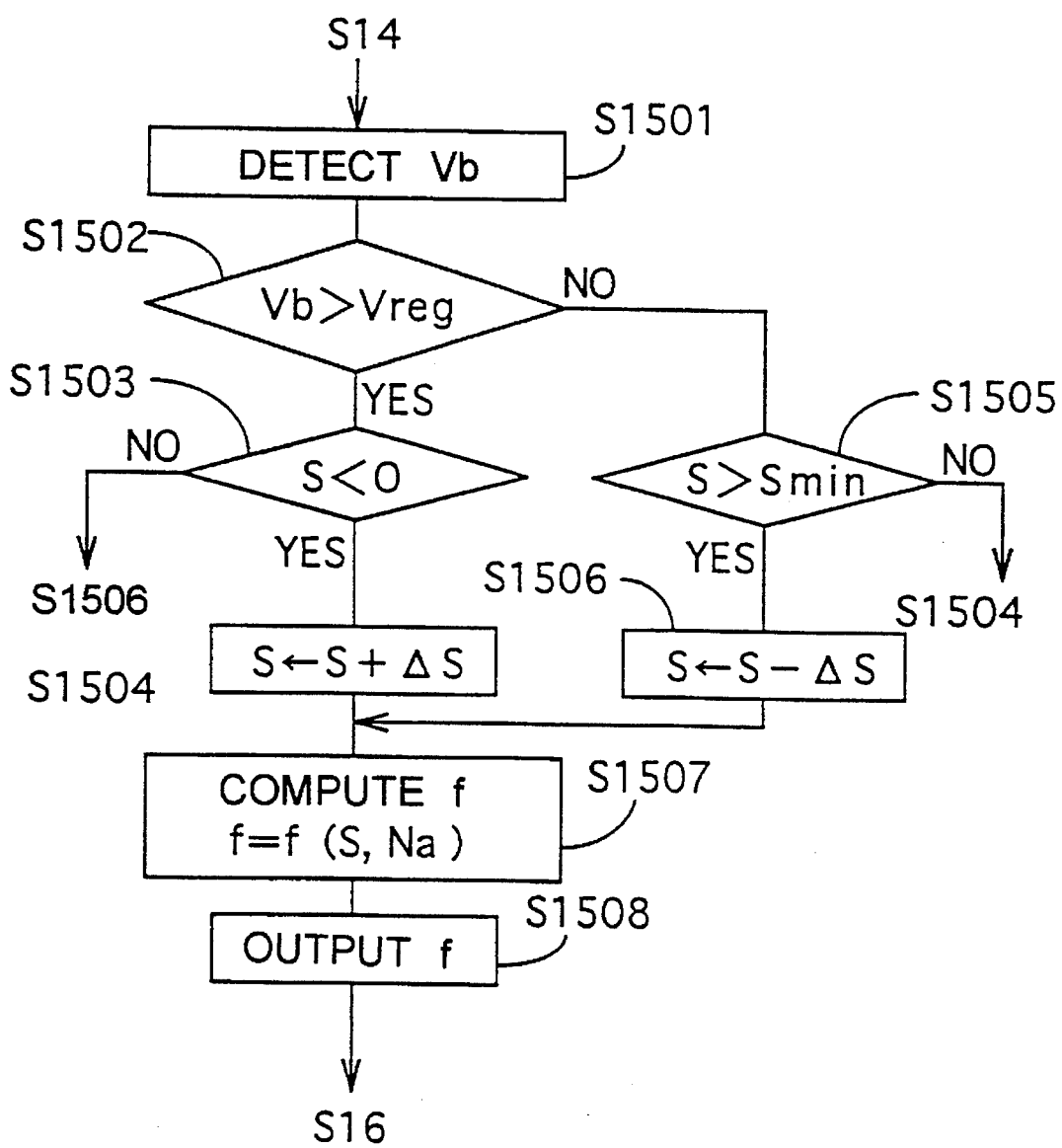
FIG. 12 is a flow chart showing an example of Step 15 in FIG. 10.

Next, the description will be given to the operation in Step S15 of FIG. 10 referring to the flow chart of FIG. 12.

First, the battery voltage Vb is detected in Step S1501, and then the battery voltage Vb is compared with the preset value (reference voltage) Vreg in Step S1502.

Figure 13:
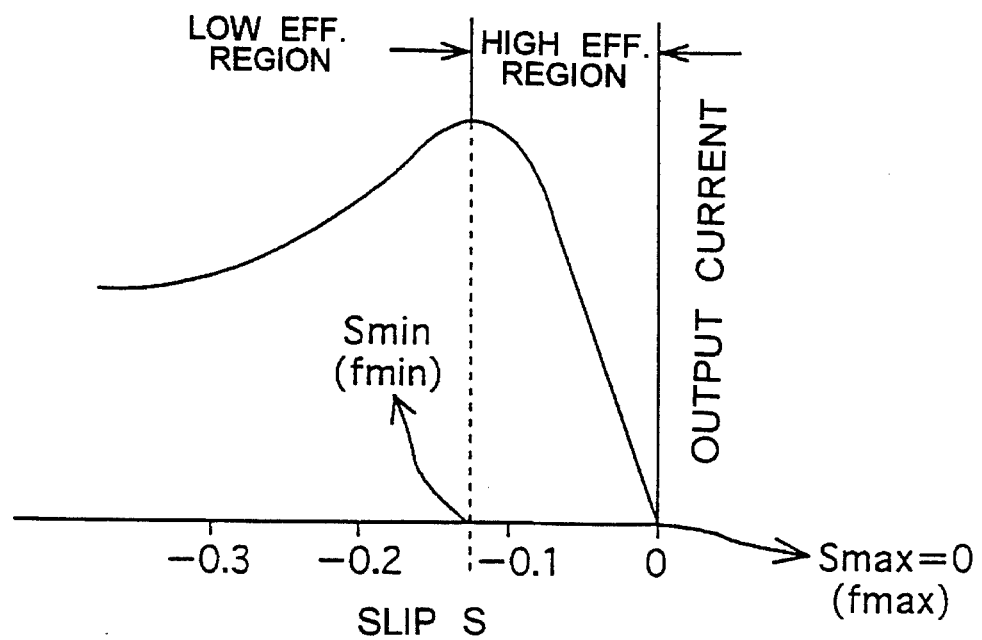
FIG. 13 is a characteristic diagram showing the electric power generating characteristics of induction machine 1.

When the battery voltage Vb is larger than the reference voltage Vreg, a check is made whether or not the slip S is negative, that is, whether or not the slip S is less than the value Smax in FIG. 13 (whether or not the device is in the electric power generating state). When the slip S is not negative, the process proceeds to Step S1506 in which the slip value S is shifted to turn the device to the electric power generating state. When the slip S is negative (the device is in the electric power generating state), the process proceeds to Step S1504 and, to reduce the output of the electric power generating machine and prevent overcharging, the positive preset value ΔS is added to the slip S to approximate the inverter frequency f to the synchronous frequency.

On the other hand, when the battery voltage Vb is not larger than the reference voltage Vreg in Step S1502, a detection is made whether or not the slip S is larger than the minimum allowable value Smin (at which the electric power generating current reaches the peak thereof). When the slip S is not larger than the value Smin, the process proceeds to Step S1504, and the slip S is shifted towards the high efficiency operation region shown in FIG. 13. When the slip S is larger than the value Smin (when the slip S is in the high efficiency operation region), the process proceeds to Step S1506 to approximate the slip S to the value Smin and reinforce the charging by increasing the positive output of the electric power generating device. That is, in Step S1506, the positive preset value ΔS is subtracted from the slip S in order to approximate the inverter frequency f, which corresponds to slip S, to the inverter frequency fmin at the peak of the output current.

Here, the relation between the slip S of the induction type electric power generating device and the output current of the same is shown in FIG. 13. Normally, the slip value is controlled within a narrow range of Smin< S<Smax taking the electric power generation efficiency into consideration, where Smin is the slip value at the output current peak, and Smax=0 is the slip when the inverter frequency is a synchronous frequency.

Then, in Step S1507, the inverter frequency f is computed by substituting the slip S computed above and the induction machine speed Na for the previously stored characteristics shown in FIG. 13. In Step S1508, the computed inverter frequency f is outputted to the inverter 2.

By a series of the operations described above, the slip S is controlled according to the battery voltage to control the electric power generation amount. As a result, even if the engine speed and the electric loads vary, the battery voltage can always be maintained to the preset reference voltage.

A fifth Embodiment, which has another method for controlling the electric power generation (in Step 15 of FIG. 10), will be described with reference to the flow chart of FIG. 14.

First, in Step S1511, the maximum value fmax and minimum value fmin of the frequency to be applied to the inverter 2 are set. The reason for setting these values is that the slip and the output current of the electric power generating device are not in a linear relation and the slip value Smin exists at which the maximum output current is generated as described above (see FIG. 13). More specifically, the maximum value fmax and minimum value fmin of the inverter frequency are computed in Step S1511 from the electric power generating device speed Na computed in Step S14 of FIG. 10 and the range of the high efficiency operation region (Smin<S<Smax=0 in this embodiment) previously determined by the intrinsic characteristics of the electric power generating device.

Next, the battery voltage Vb is detected in Step S1512, and the battery voltage Vb is compared with the preset value (reference voltage) Vreg in Step S1513.

When the battery voltage Vb is larger than the reference voltage Vreg, a check is made in Step S1514 whether or not the inverter frequency f is larger than the value fmax (synchronous frequency), that is, whether or not the inverter frequency exceeds the synchronous frequency fmax and is at the operation side as the electric motor. When the inverter frequency f is not at the operation side as the electric motor (that is, if the inverter frequency f is equal to or lower than value fmax (synchronous frequency)), as the inverter frequency is within the high efficiency operation region shown in FIG. 13, the process proceeds to Step S1516 to reduce the output of the electric power generating device and prevent overcharging, and the preset value Δf is added to the inverter frequency f. On the other hand, when the inverter frequency f exceeds the value fmax (synchronous frequency), as the inverter frequency is at the electric motor operation side, the process proceeds to Step S1517, and the preset value Δf is subtracted from the inverter frequency f to return the working point into the high efficiency operation region in FIG. 13.

On the other hand, when the battery voltage Vb is not larger than the reference voltage Vreg, a check is made in Step S1515 whether or not the inverter frequency f is larger than the value fmin (peak frequency). When the inverter frequency f is smaller than the peak frequency fmin, it is judged that the inverter frequency f is in the low efficiency operation region (see FIG. 13), and then the process proceeds to Step S1516. That is, when the inverter frequency f decreases in excess of the value fmin, as the inverter frequency f is in the low efficiency operation region, the process proceeds to Step S1516, and the preset value Δf is added to the inverter frequency f to return the working point into the high efficiency operation region. On the other hand, when the inverter frequency is not in the low efficiency operation region (when the inverter frequency f is larger than value fmin (peak frequency)), as the inverter frequency is within the high efficiency operation region shown in FIG. 13, the process proceeds to Step S1517, and the preset value Δf is subtracted from the inverter frequency f so as to reinforce the charging operation by increasing the output of the electric power generating device. Then, the present value of the inverter frequency f computed in Steps S1516 or S1517 is outputted to the inverter 2, and the process proceeds to Step S16 of FIG. 10.

Figure 14:
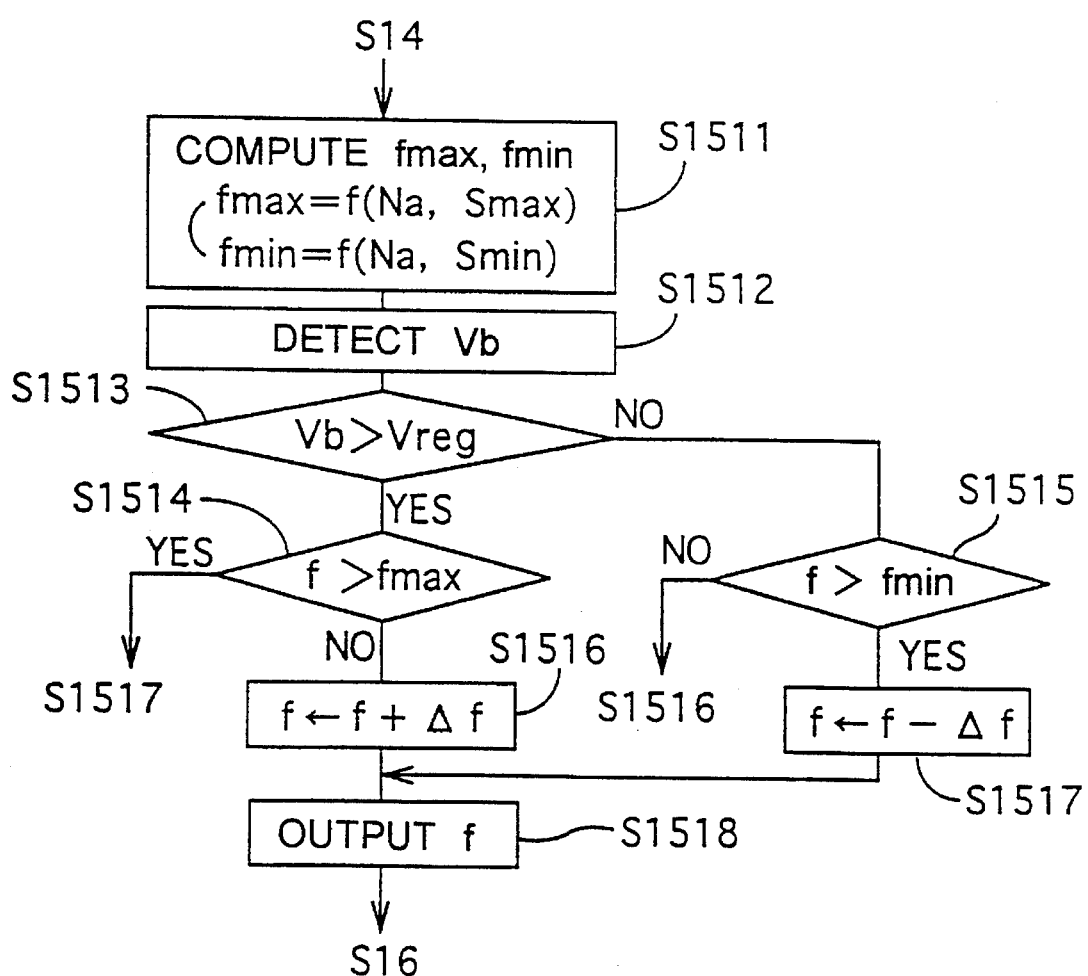
FIG. 14 is a flow chart showing another example of Step 15 in FIG. 10.

By repeating a series of the operations, i.e., Step S130 through S16 of FIG. 10 including Step S1511 through S1518 of FIG. 14, the battery voltage Vb ($V_B$ in FIG. 9) can be maintained to the proper value all the time.

Here, it should be noted that the inverter frequency f is compared with the values fmin or fmax in Steps S1514 or S1515. This process is significant for the following reason:

When the battery voltage is lower than the reference voltage in Step S1513, the frequency should be lowered by Δf. However, as the relation between the slip S and the output current of the electric power generating device is characterized by a single peak expressing the maximum value, if the frequency f is set to a value lower than the minimum frequency fmin (corresponding to the slip Smin) set in Step S1511, contrarily, the output of the electric power generating device decreases. For example, the battery voltage Vb is lowered by the operation for increasing the same voltage caused in response to the excessively low battery voltage Vb by the increase in the electric loads. This embodiment gives a solution to this problem.

Likewise, by comparing the frequency f with the value fmax in Step S1514, the slip S is prevented from shifting from a negative value (for the generating operation mode) to a positive value (for the motor operation mode).

In the above embodiment, the whole of the high efficiency operation region shown in FIG. 13 is considered as the control operation region. However, the control operation region may freely be set as long as the same is within the above high efficiency operation region.

Furthermore, in the fourth and fifth embodiments, the signal of the engine RPM sensor 10a is arranged to be sent to both the engine controlling device 100 for controlling the engine (see FIG. 9) and the controller 3 for controlling the inverter 2. However, of course, it may also be arranged that the controller 3 receives the engine speed Ne from the engine controlling device 100.

Moreover, in the fourth and fifth embodiments, the controller 3 inputs the engine speed and the P-terminal voltage of the induction machine (W-phase voltage) and thereby the pulley ratio is computed (see Steps S05 through S13 of FIG. 10). However, it may also be arranged that, after the P terminal voltage is inputted into the engine controlling device 100 and thereby the pulley ratio is computed in the engine controlling device 100, the electric power generating device speed Na is computed in relation to the engine speed Ne and inputted into the controller 3 and thereby the electric power generation is controlled. In this composition, the computation and the storing of the pulley ratio can be performed by using the microcomputer provided within the engine controlling device 100 without composing the controller 3 from a microcomputer (see FIG. 17).

Figure 15:
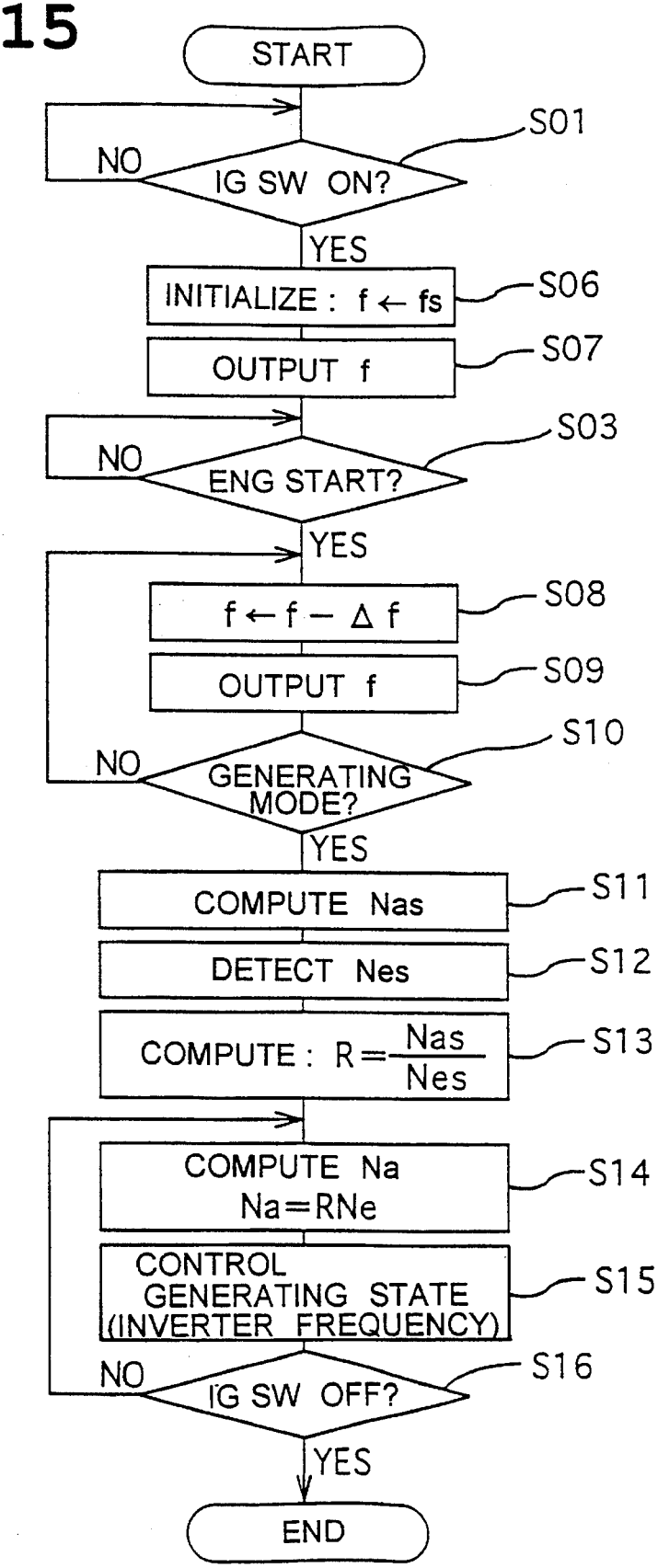
FIG. 15 is a flow chart showing an operation of controlling electric power generation in a sixth embodiment.

Next a sixth embodiment will be described referring to FIG. 15.

This embodiment can also be modified to avoid the composition of the controller 3 from a microcomputer by arranging that the engine controlling device 100 for controlling engine (see FIG. 9) processes for the computation of the revolution number of the electric power generating device as discussed above (see FIG. 17).

First, when the ON state of the ignition switch is detected in Step S01, the initial value of the inverter frequency f to be applied to the inverter 2 is set to the value fs (Step S06), and the inverter frequency f=fs is outputted to the inverter in Step S07. The initial value fs is set to be higher than the value of the inverter frequency which synchronizes with the preset engine speed after the engine start.

When the engine start is confirmed in Step S03, the preset value Δf is subtracted from the inverter frequency f. That is, in order to start the engine, the inverter frequency f=fs is higher than the synchronous frequency at the time when the engine start is confirmed and the induction machine 1 is at the electric motor Side. Therefore, it is necessary for the inverter frequency f outputted to the inverter 2 to be reduced by the value Δf, and then the induction machine 1 is shifted to the electric power generation side.

In Step S10, a detection is made whether or not the induction machine 1 has started to operate as an electric power generator. The start of electric power generation can be detected by the direction of the current at the DC end of the inverter 2, for example. If the induction machine 1 shifts immediately after the engine starts from the electric motor operation mode to the electric power generation mode by repeating Step S08, as the voltage at the DC end of the inverter 2 gradually increases, the start of electric power generation can be detected by this fact.

Figure 16:
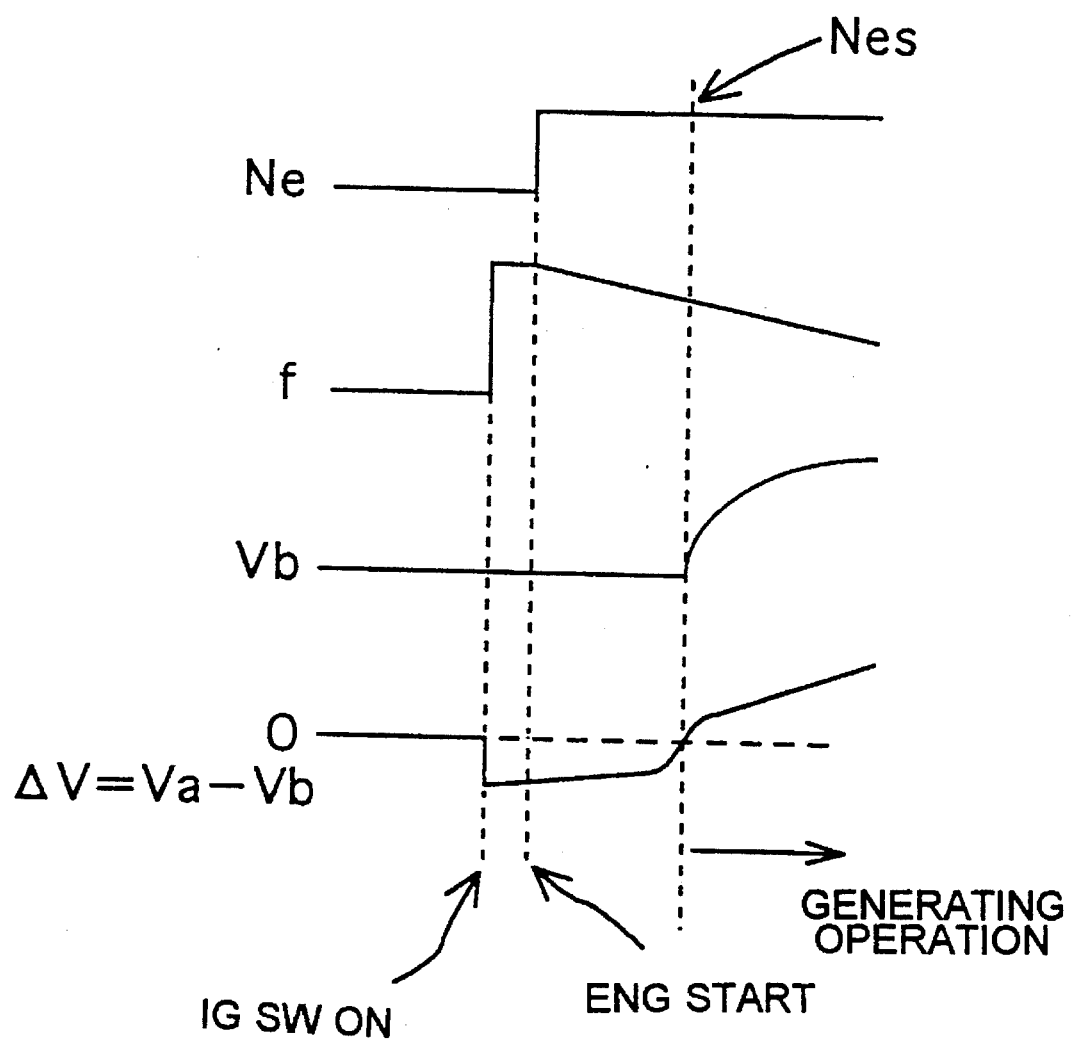
FIG. 16 is a timing chart showing the variation of the respective parameters before and after the engine starts.

The operations of detecting the above start of electric power generation will further be described with reference to FIG. 16. FIG. 16 shows the variation of the respective parameters before and after the engine start. As apparent from FIG. 16, the start of electric power generation can be detected by the time when the battery voltage Vb exceeds the preset level. This method uses the principle that when the induction machine 1 is switched from the electric motor mode to the electric power generation mode, the battery 4 is switched from discharging to charging and the battery voltage Vb increases.

There is another method for detecting the start of electric power generation in which the output current of the induction machine 1 is detected. This method uses the principle that when the induction machine 1 is switched from the electric motor operation mode to the electric power generator operation mode, the output current thereof is switched from negative to positive. The output current can be detected by using an electric current sensor, or as only the polarity of the output current is judged, the detection can simply be performed by detecting the voltage drop ΔV (=VA-$V_B$) of the wire (charging wire) between the induction machine 1 and the battery 4 for judgment, for example.

If, in Step S10, it is confirmed that the inverter 2 starts to charge the battery 4 by detecting the terminal voltage and charging current of the battery 4 as described above, for example, the process proceeds to Step S11. Until the above start of charging is confirmed, Steps S08 through S10 are repeated.

When the frequency at the time when the induction machine 1 has shifted from the electric motor mode to the electric power generation mode (when electric power generation is started and slip S=0) can be detected by gradually reducing the inverter frequency f, the revolution number Nas of the induction machine 1 at this time can easily be computed from the generated voltage frequency related to the inverter frequency f in Step S11 as described in the fourth embodiment. Accordingly, the RPM ratio (pulley ratio) can be computed from the induction machine speed Nas and the engine speed Ne at this time.

That is, the engine speed Nes at this time is obtained from the RPM sensor 10a in Step S12, and at the same time, the RPM ratio R=Nas/Nes is computed in Step S13. Hereafter, the electric power generating device speed Na when generation state is controlled is computed in Step S14 from the RPM ratio R and the engine speed Ne detected periodically, in the same way as the fourth embodiment, to most suitably control electric power generation in Step S15.

In the above embodiment, the point at which the induction machine 1 is switched from the electric motor operation side to the electric power generating operation side is searched by gradually reducing the inverter frequency f. However, the same effect can be obtained by gradually increasing the inverter frequency f to search the point at which the induction machine 1 is switched from the electric power generating operation side to the electric motor operation side.

As described above, according to the fourth to sixth embodiments, the RPM of the electric power generating device 1 can be obtained by using the signal of the RPM sensor 10a providing to the engine for controlling the engine, for example, without providing any RPM sensor dedicated for the electric power generating device. For this reason, the composition can be simple and therefore the cost can be reduced, and at the same time, the lowering of reliability caused by attaching the RPM sensor to the highly vibratory electric power generating device 1 can be prevented.

In addition, as the revolution number of the electric power generating device 1 can exactly be obtained, the value of the slip S can be maintained within the optimum range all the time even when the frequency is controlled according to the battery voltage in an induction machine type electric power generating device (engine) for vehicles in which the RPM greatly varies. As the result, the induction type electric power generating device can stably be controlled.

In the fourth to sixth embodiments, the RPM ratio R is computed each time immediately after the engine start. However, the method is not restricted thereto, and the same effect can be obtained by computing the same when the vehicle is running or immediately before the engine stops. In addition, considering that the pulley ratio does not suddenly vary, the same effect can be obtained by performing the computation and storing periodically or before the delivery from the factory (and at the time when the electric power generating device is changed) instead of performing the same each time. Likewise, the influence of the detection error, etc. can be eliminated by obtaining the mean value (RPM ratio) of the values previously measured for several times.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electric power generating device for vehicles comprising:

an induction type electric rotating machine including an armature wound with an armature winding and a rotor working with an engine;

an electric power storing device charged by the electric power generating output from said armature winding;

an inverter connected at the alternating current side to an end of said armature winding and at the direct current side to said electric power storing device for exciting said armature winding by the output of said electric power storing device and supplying said electric power storing device with the electric power generating output of said armature winding;

a detecting means for detecting the quantity of state related to the electric power generating voltage of said induction type electric rotating machine excluding the actually measured revolution number of said induction type electric rotating machine but including the electric power storing voltage of said electric power storing device; and an electric power generation controlling device for maintaining said electric power storing voltage within the preset range by controlling the frequency of the controlling voltage of said inverter based on the quantity of state related to said electric power generating voltage.

2. The electric power generating device according to claim 1, wherein said electric power generation controlling means changes said frequency in the direction in which the difference between the electric power storing voltage of said electric power storing device and the preset reference voltage is reduced.

3. The electric power generating device according to claim 1 or 2, wherein said electric power generation controlling means computes the revolution number of said induction type electric rotating machine by multiplying the engine speed or the value obtained by multiplying the engine speed by a belt slip ratio by the preset belt speed-increasing ratio and determines said frequency by using the computed revolution number of said induction type electric rotating machine and the target slip value of said rotor.

4. The electric power generating device according to claim 1 or 2, wherein said electric power generation controlling means sets the minimum value of said frequency to a value lower than the synchronous frequency of said induction type electric rotating machine at the time when said engine is in idling when said electric power generation controlling means operates in the generating mode.

5. The electric power generating device according to claim 1, wherein said electric power generation controlling means detects the electric power generating current as the quantity of state related to the electric power generating voltage of said induction type electric rotating machine and controls said frequency based on said electric power generating current.

6. The electric power generating device according to claim 1 or 2, wherein said electric power generation controlling means detects the electric power generating voltage of the armature winding of said induction type electric rotating machine and controls said frequency based on said electric power generating voltage.

7. The electric power generating device according to claim 5, wherein said electric power generation controlling means computes said electric power generating current based on the difference between said electric power generating voltage and the electric power storing voltage.

8. The electric power generating device according to claim 1 or 2, wherein said electric power generation controlling means computes the slip value of said rotor based on the electric power generating voltage and electric power generating current of said armature winding and computes the revolution number of said induction type electric rotating machine from the slip value and said frequency and determines said frequency by using the computed revolution number and the target slip value of said rotor.

9. The electric power generating device according to claim 1, wherein said electric power generation controlling means includes a frequency characteristic judging means for detecting the relation between the changing direction of the frequency observed by changing the frequency of the controlling voltage of said inverter and the changing direction of the quantity of state related to said electric power generating voltage and determines the frequency of said inverter according to the relation between the changing directions and said quantity of state.

10. The electric power generating device according to claim 9, wherein said electric power generation controlling means includes a frequency changing means for changing the frequency of said inverter according to said engine speed.

11. The electric power generating device according to claim 10, wherein said frequency changing means changes said frequency in proportion to said engine speed.

12. The electric power generating device according to claim 1, wherein said electric power generation controlling means includes an RPM estimating means for estimating the revolution number of said electric rotating machine by the output state thereof after said engine starts and an RPM ratio detecting means for computing the revolution ratio of said engine to the estimated revolution number by said RPM estimating means and storing the same and maintains said electric power storing voltage within the preset range by controlling the frequency of said inverter according to the stored RPM ratio, said engine speed and said electric power storing voltage.

13. The electric power generating device according to claim 12, wherein said RPM estimating means computes the revolution number as a function of the frequency of the voltage generated in said armature winding during the OFF period of said inverter after said engine starts.

14. The electric power generating device according to claim 13, wherein said RPM estimating means commands said inverter to supply electric current to at least one phase of said armature winding before estimating the revolution number.

15. The electric power generating device according to claim 12, wherein said RPM estimating means computes the revolution number as a function of the inverter frequency at the time when the quantity of state corresponding to the voltage at the direct current side of said inverter reaches the preset value when the frequency of said inverter is changed.

16. The electric power generating device according to claim 12, wherein said RPM estimating means computes the revolution number as a function of the inverter frequency at the time when the polarity of the output current at the direct current side of said inverter is changed when the frequency of said inverter is changed.

17. The electric power generating device according to claim 1 or 2, wherein the rotor of said induction type electric rotating machine is a squirrel-cage rotor and driven by said engine through a belt and pulleys.

18. The electric power generating device according to claim 1 or 2, wherein said inverter includes six MOS power transistors in three-phase bridge connection.

* * * * *